US011577376B2

(12) United States Patent
Tamura et al.

(10) Patent No.: US 11,577,376 B2
(45) Date of Patent: Feb. 14, 2023

(54) ELECTRIC DEVICE

(71) Applicant: KOKI HOLDINGS CO., LTD., Tokyo (JP)

(72) Inventors: Kengo Tamura, Hitachinaka (JP); Takuhiro Murakami, Hitachinaka (JP); Junichi Toukairin, Hitachinaka (JP); Yoshihiro Komuro, Hitachinaka (JP); Masaru Hirano, Hitachinaka (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 256 days.

(21) Appl. No.: 16/634,866

(22) PCT Filed: Aug. 31, 2018

(86) PCT No.: PCT/JP2018/032394
§ 371 (c)(1),
(2) Date: Jan. 28, 2020

(87) PCT Pub. No.: WO2019/065088
PCT Pub. Date: Apr. 4, 2019

(65) Prior Publication Data
US 2020/0215679 A1    Jul. 9, 2020

(30) Foreign Application Priority Data

Sep. 29, 2017  (JP) .............................. JP2017-192103
Dec. 22, 2017  (JP) .............................. JP2017-246390

(51) Int. Cl.
*B25F 5/00*       (2006.01)
*H01M 50/213*  (2021.01)
*B25F 5/02*       (2006.01)

(52) U.S. Cl.
CPC ................ *B25F 5/006* (2013.01); *B25F 5/02* (2013.01); *H01M 50/213* (2021.01); *H01M 2220/30* (2013.01)

(58) Field of Classification Search
CPC ........ B25F 5/006; B25F 5/02; H01M 2220/30
See application file for complete search history.

(56) References Cited

U.S. PATENT DOCUMENTS 4,667,749 A * 5/1987 Keller ..................... B25F 5/006
                                                                267/140.13
4,746,047 A * 5/1988 Boiko ..................... B25C 1/188
                                                                227/120

(Continued)

FOREIGN PATENT DOCUMENTS

JP      H10296660 A    11/1998
JP      2008302457 A   12/2008

(Continued)

OTHER PUBLICATIONS

International Preliminary Report on Patentability, dated Mar. 31, 2020 in corresponding PCT/JP2018/032394.

(Continued)

*Primary Examiner* — Nathaniel C Chukwurah
*Assistant Examiner* — Lucas E. A. Palmer
(74) *Attorney, Agent, or Firm* — NovoTechIP International PLLC

(57) ABSTRACT

Provided is an electric device capable of suppressing vibration of a battery pack. Included are: a first housing 21 accommodating a load portion that consumes electric power; a second housing 22 having one end portion connected to the first housing 21 and another end portion to which a battery pack 9 is connectable; and an elastic member 40 interposed between the first housing and the second housing. The first housing includes a first restricting portion 42 positioned away from the elastic member, and the second housing (Continued)

includes a second restricting portion 44 positioned away from the elastic member and engageable with the first restricting portion. In a case where the second housing is urged to be separated from the first housing, the elastic member is deformed and the first restricting portion and the second restricting portion are engaged with each other to prevent separation.

17 Claims, 22 Drawing Sheets

(56) References Cited

U.S. PATENT DOCUMENTS

| | | | | |
|---|---|---|---|---|
| 4,986,369 | A * | 1/1991 | Fushiya | B25B 21/00 |
| | | | | 173/178 |
| 8,573,322 | B2 * | 11/2013 | Nagasaka | B25F 5/02 |
| | | | | 173/171 |
| 9,266,217 | B2 * | 2/2016 | Esenwein | B24B 41/007 |
| 10,076,833 | B2 * | 9/2018 | Tada | H01M 50/20 |
| 2007/0044984 | A1 * | 3/2007 | Fischer | B25F 5/006 |
| | | | | 173/217 |
| 2008/0302552 | A1 * | 12/2008 | Kondo | H01M 50/209 |
| | | | | 173/217 |
| 2011/0147031 | A1 | 6/2011 | Matthias et al. | |
| 2011/0198103 | A1 | 8/2011 | Suzuki | |
| 2014/0014385 | A1 | 1/2014 | Kosugi et al. | |
| 2014/0294483 | A1 | 10/2014 | Hanawa et al. | |
| 2015/0328764 | A1 | 11/2015 | Yoshikane et al. | |
| 2015/0357612 | A1 * | 12/2015 | Uchida | H01M 50/213 |
| | | | | 429/99 |
| 2017/0239803 | A1 * | 8/2017 | Aoki | B25F 5/008 |

FOREIGN PATENT DOCUMENTS

| | | |
|---|---|---|
| JP | 2010042477 A | 2/2010 |
| JP | 2011161603 A | 8/2011 |
| JP | 2011526217 A | 10/2011 |
| JP | 2013255960 A | 12/2013 |
| JP | 2014018894 A | 2/2014 |
| JP | 2014193500 A | 10/2014 |
| JP | 2015033733 A | 2/2015 |
| WO | 2014119756 A1 | 8/2014 |

OTHER PUBLICATIONS

Office Action dated Oct. 6, 2020 in corresponding Japanese Patent Application No. 2019-544473 (English Translation Provided).
International Search Report and Written Opinion dated Nov. 20, 2018 by the International Searching Authority (Japan Patent Office) in PCT Application PCT/JP2018/032394 (English Translation of the ISR).

* cited by examiner

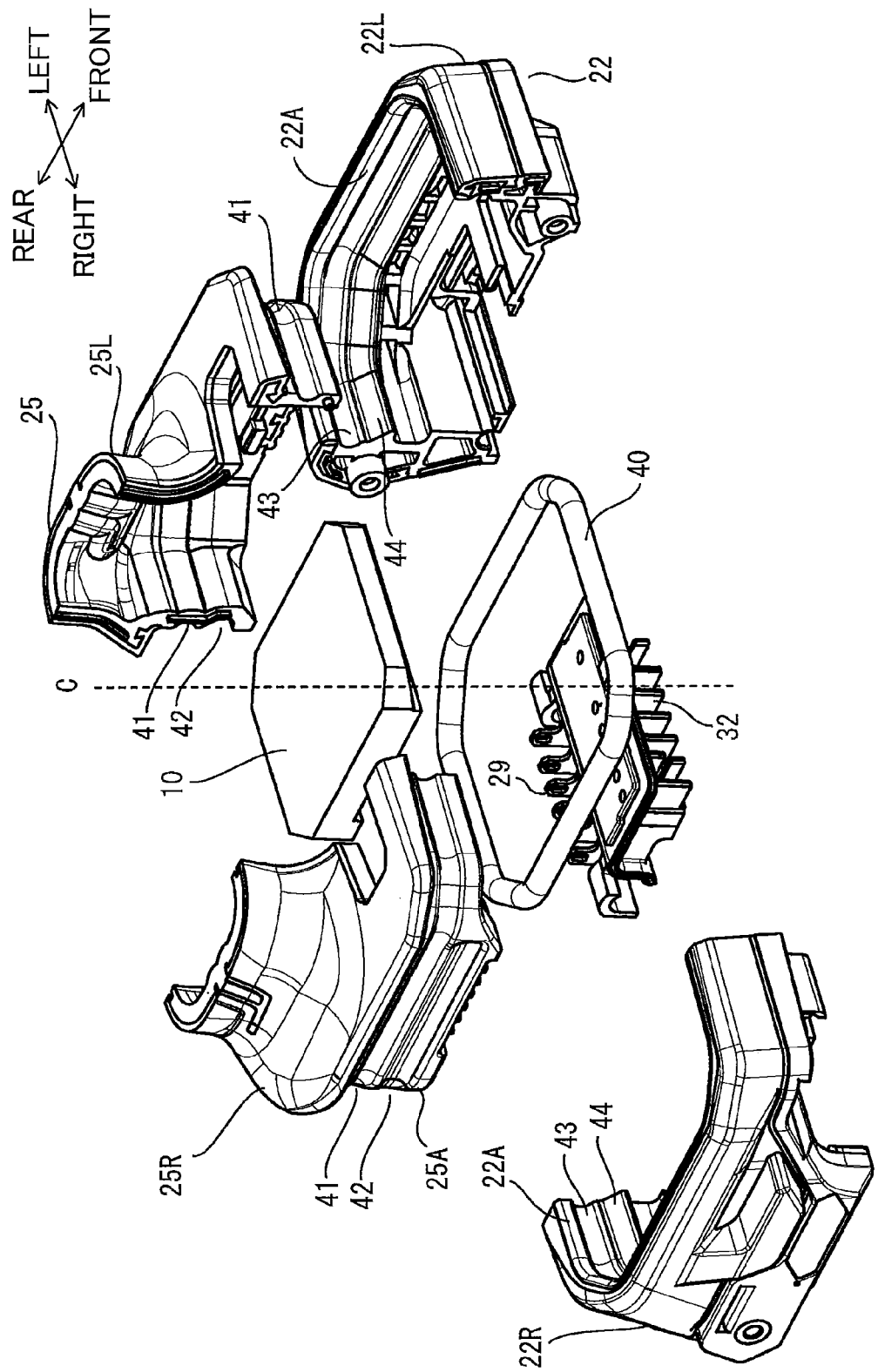

FIG. 5
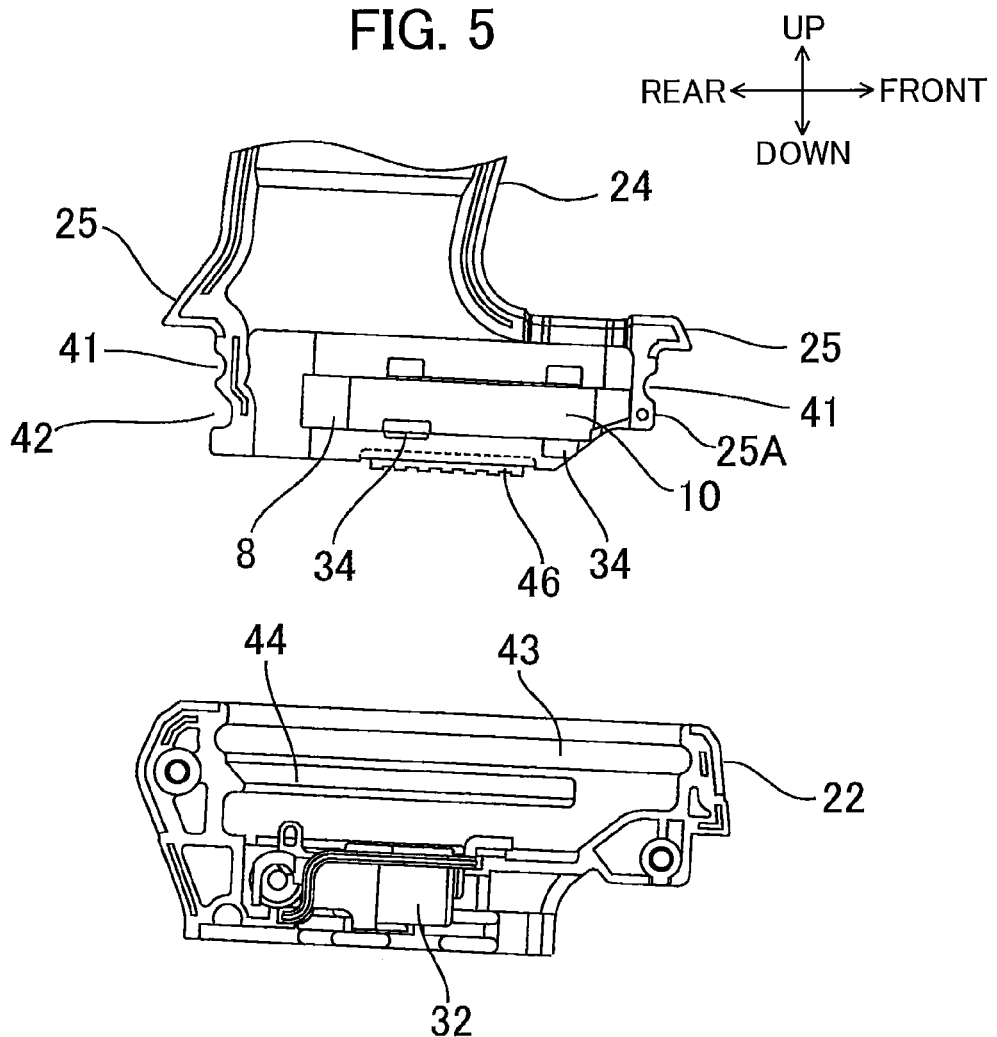
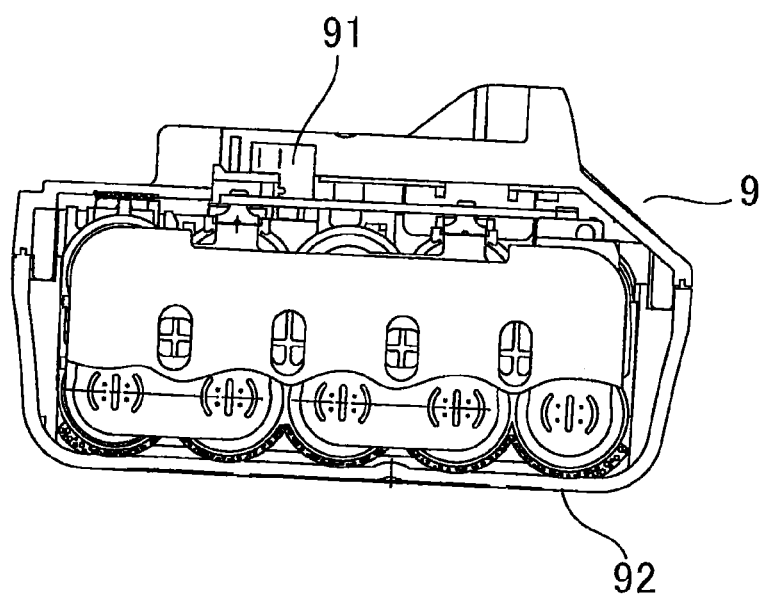

FIG. 10
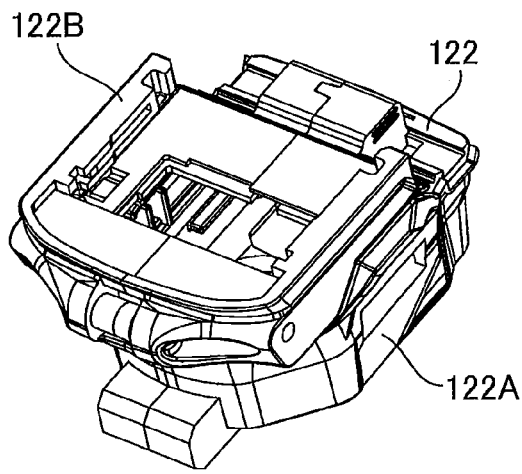
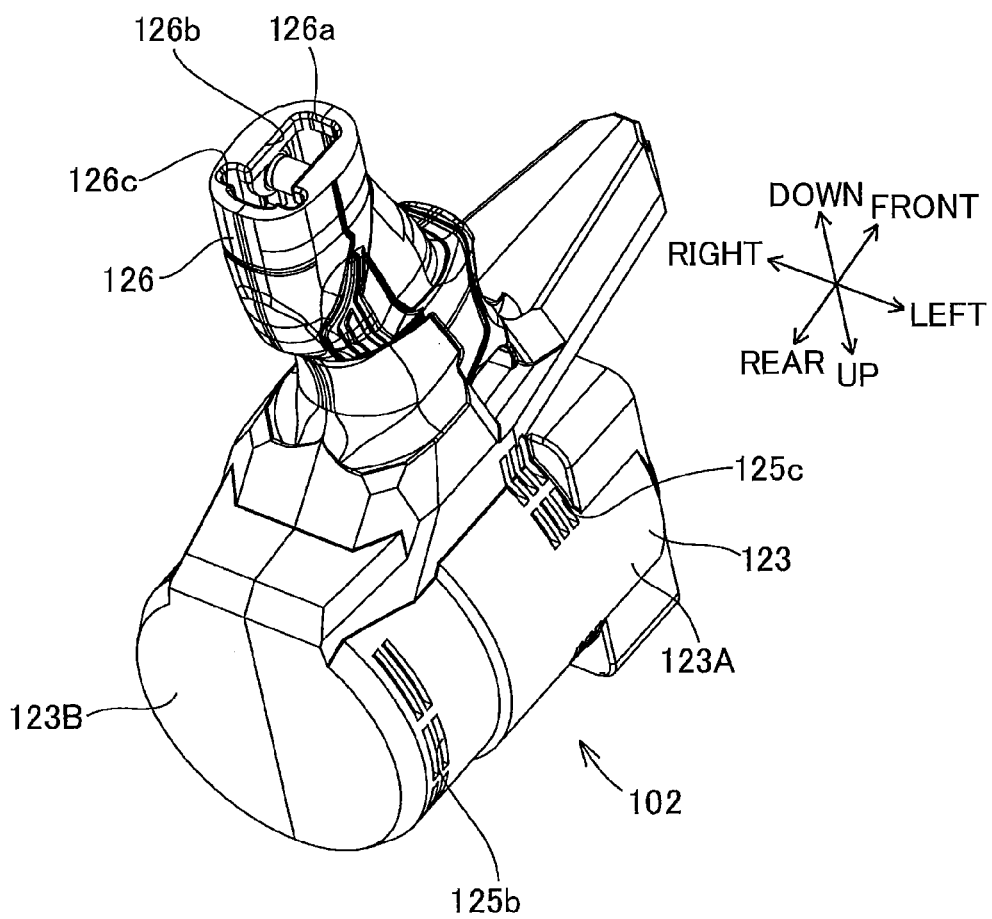

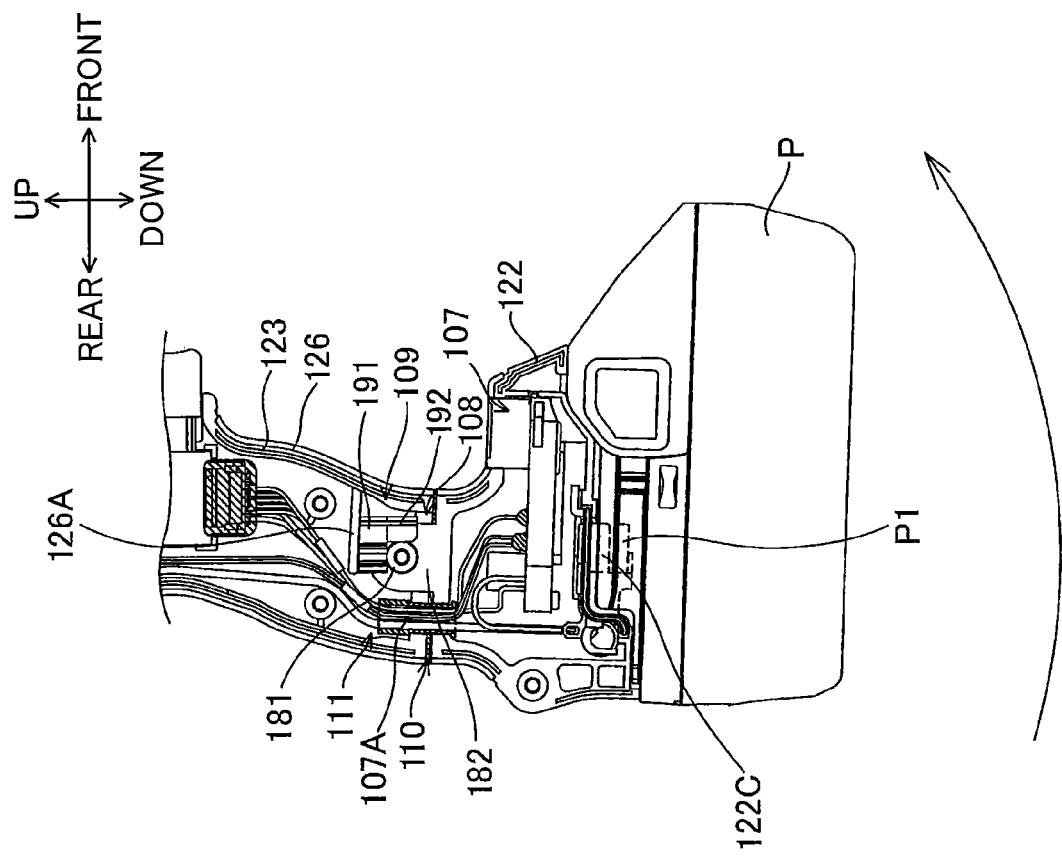
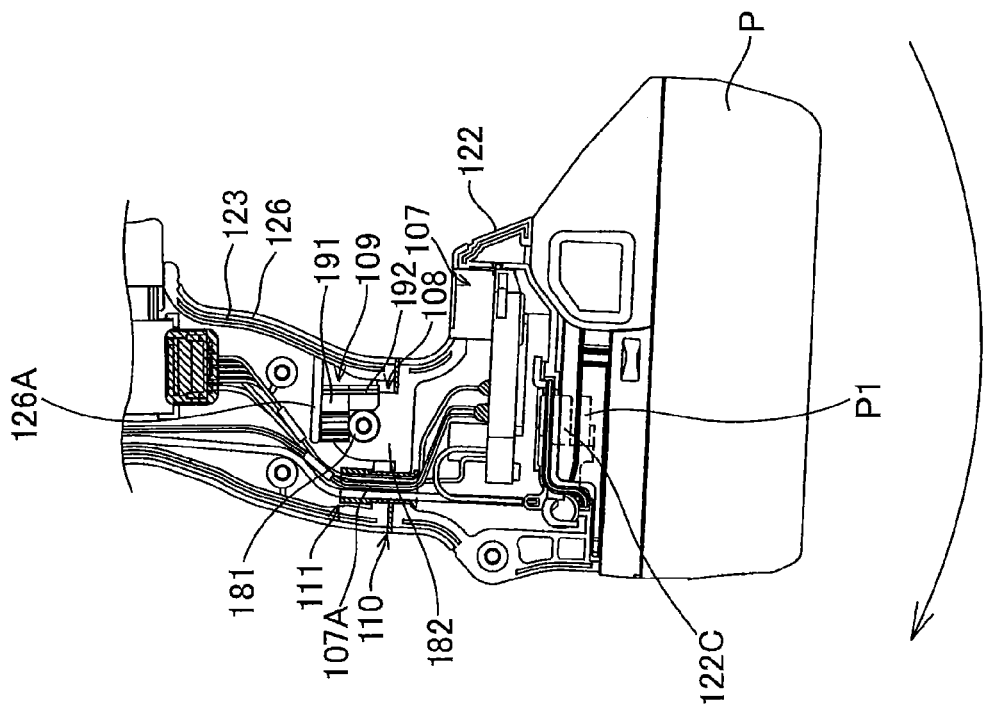

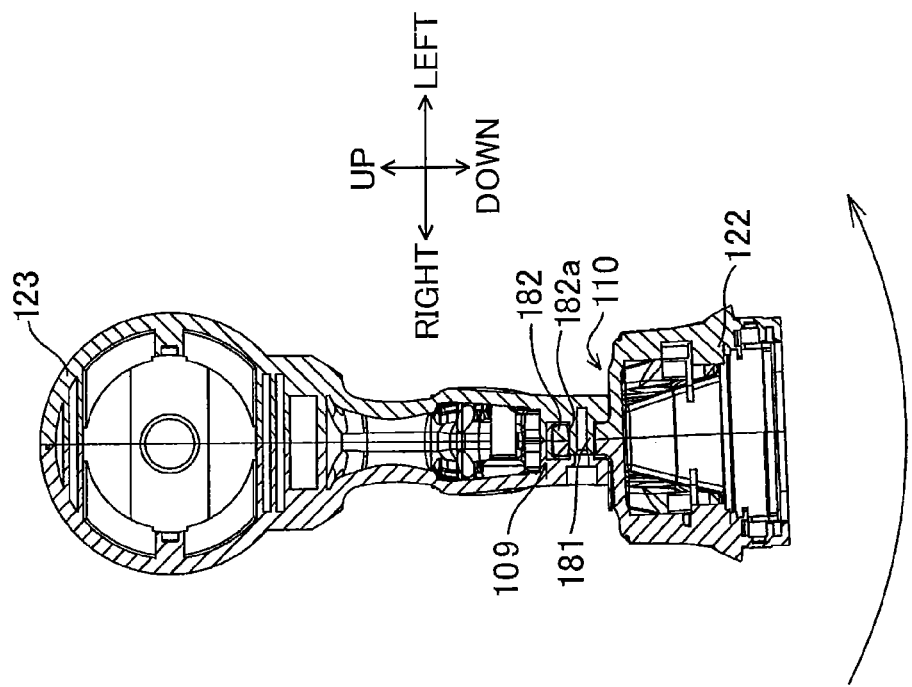

ELECTRIC DEVICE

TECHNICAL FIELD

The present invention relates to an electric device driven by a battery pack as a power source.

BACKGROUND ART

An electric device driven by a battery pack as a power source is known in the art. There has been proposed a structure where an elastic member is attached to a main body of the electric device in contact with the battery pack in order to restrain vibration transmitted to the battery pack. The vibration occurs due to operation of an end bit attached to the electric device (see Patent Literature 1).

CITATION LIST

[Patent Literature 1] Japanese Patent Application Publication No. Hei10-296660

SUMMARY OF INVENTION

Technical Problem

However, vibration of the battery pack may occur due to insufficient vibrational absorption by the elastic member. Such vibration of the battery pack may affect electrical connection between the battery pack and the main body of the electric device. Further, electrical disconnection may occur between the battery pack and the main body of the electric device. There is a demand for further suppressing vibration of the battery pack.

Accordingly, it is an object of the present invention to restrain vibration of the battery pack, in other words, to restrain transmission of vibration from the main body of the electric device to the battery pack. Further, another object is to improve durability of the main body of the electric device, and to obviate electrical breaking between the main body of the electric device and the battery pack.

Solution to Problem

An electric device according to the present invention includes: a first housing accommodating therein a load portion configured to consume an electric power; a second housing having one end portion connected to the first housing and another end portion to which a battery pack is connectable; and an elastic member interposed between the first housing and the second housing. The first housing includes a first restricting portion positioned away from the elastic member, and the second housing includes a second restricting portion positioned away from the elastic member and engageable with the first restricting portion. In a case where the second housing is urged to be separated from the first housing, the elastic member is deformed and the first restricting portion and the second restricting portion are engaged with each other to prevent the second housing from being separated from the first housing.

With the structure described above, since the second housing is connected to the first housing through the elastic member, vibration generated in the load portion due to power consumption is absorbed by the elastic member to restrain transmission of vibration to the second housing. Further, even if the second housing is urged to be separated from the first housing due to displacement of the second housing relative to the first housing by the vibration, such movement is prevented by the first and second restricting portions. Hence, disconnection of the second housing from the first housing can be avoided.

Preferably, a second elastic member is provided so as to be interposed between a confronting portion of the first housing in confrontation with the second housing and the one end portion of the second housing. With this structure, even if the first housing moves toward the second housing due to accidental application of external force, the second elastic member can prevent the first housing from coming into direct contact with the second housing.

Preferably, one of the first restricting portion and the second restricting portion includes a protruding portion protruding from the one of the first housing and the second housing toward a remaining one of the first housing and the second housing; and the remaining one of the first restricting portion and the second restricting portion includes a recessed portion receiving the protruding portion with a gap provided therebetween. With this structure, the second housing can be securely connected to and supported by the first housing. Even if the second housing is moved relative to the first housing in a direction away from the first housing due to accidental application of external force, the movement is prevented by the first and second restricting portions. Hence, separation of the second housing from the first housing can be avoided.

Further, the first housing may include a terminal portion electrically connected to the load portion, and the second housing may include, on the one end portion thereof, a terminal portion electrically connected to the battery pack. The terminal portion of the second housing and the terminal portion of the first housing are configured to be electrically connected to each other when the second housing is connected to the first housing.

With this structure, vibration generated due to driving of the load portion is less likely to be transmitted to a portion where the first housing and the second housing are electrically connected to each other. Accordingly, frictional wearing of the terminal portion at the large diameter portion and the terminal portion of the second housing due to vibration can be restrained.

Preferably, the first housing includes: a load accommodating portion accommodating the load portion therein; a handle portion connected to the load accommodating portion and configured to be gripped by a user; and a large diameter portion connected to the handle portion at a position opposite to the load accommodating portion with respect to the handle portion, the large diameter portion having a diameter greater than a diameter of the handle portion. The elastic member, the first restricting portion, and the second restricting portion are positioned between the large diameter portion and the second housing.

With this structure, since the second housing is connected to the first housing through the elastic member, vibration generated in the load portion due to power consumption is absorbed by the elastic member to restrain transmission of vibration to the second housing. Since the vibration of the second housing can be restrained, vibration of the battery pack attached to the second housing can also be restrained. Further, since the elastic member is interposed between the second housing and the large diameter portion whose diameter is greater than that of the handle portion, stress applied to the elastic member due to vibration can be dispersed to improve durability of the elastic member. Further, since the elastic member is provided at an outer peripheral portion of the large diameter portion, a main body of the electric device has no small diameter portion by the provision of the elastic member. Hence, damage to the main body of the electric device can be restrained to improve durability.

Preferably, the second housing is spaced away from the large diameter portion only by the elastic member. The large diameter portion and the second housing respectively include restricting portions contactable with each other due to deformation of the elastic member to prevent one of the large diameter portion and the second housing from being detached from the other. With this structure, the first housing and the second housing are held to be spaced away from each other, but are brought into direct contact with each other when accidental external force is applied to the first housing or the second housing, for example, when the electric device is dropped. Accordingly, the second housing can be prevented from being released from the first housing.

Preferably, a control portion configured to control the load portion may be further provided. The control portion is accommodated in the large diameter portion. With this structure, breaking of the wires electrically connecting the control portion to the load portion can be restrained.

An electric device of the present invention includes a first housing, a second housing, a control portion, and an elastic member. The first housing includes: a load accommodating portion accommodating therein a load portion configured to consume an electric power; a handle portion connected to the load accommodating portion and configured to be gripped by a user; and a large diameter portion connected to the handle portion at a position opposite to the load accommodating portion with respect to the handle portion, the large diameter portion having a diameter greater than a diameter of the handle portion. The second housing has one end portion attached to the large diameter portion, and another end portion for holding a battery pack. The control portion is accommodated in the large diameter portion and is configured to control the load portion. The elastic member is interposed between the large diameter portion and the one end portion of the second housing to connect the second housing to the large diameter portion.

With this structure, since the second housing is connected to the first housing through the elastic member, vibration generated in the load portion due to power consumption is absorbed by the elastic member to restrain transmission of vibration to the second housing. Since the vibration of the second housing can be restrained, vibration of the battery pack attached to the second housing can also be restrained. Further, since the elastic member is interposed between the second housing and the large diameter portion whose diameter is greater than that of the handle portion, stress applied to the elastic member due to vibration can be dispersed to improve durability of the elastic member. Further, since the elastic member is provided at the outer peripheral portion of the large diameter portion, no small diameter portion is provided in the main body of the electric device due to the provision of the elastic member. Hence, damage to the main body of the electric device can be restrained to improve durability.

Preferably, the second housing is spaced away from the large diameter portion only by the elastic member. The large diameter portion and the second housing respectively include restricting portions contactable with each other upon deformation of the elastic member to prevent the second housing from being separated from the first housing. With this structure, the first housing and the second housing are maintained to be spaced away from each other, but these can directly contact with each other when accidental external force is applied to the first housing or the second housing, for example, when the electric device is dropped. Accordingly, release of the second housing from the first housing can be prevented.

Preferably, the restricting portions are positioned away from the elastic member. With this structure, even if the position of the second housing relative to the first housing is urged to be changed due to deformation of the elastic member caused by the accidental application of external force, the first housing and the second housing can contact with each other through the restricting portions. Hence, further movement of the second housing relative to the first housing can be stopped. Accordingly, separation of the second housing from the first housing can be avoided, and rupture of the elastic member can be prevented.

Preferably, a second elastic member may be provided so as to be interposed between the one end portion of the second housing and a confronting portion of the large diameter portion in confrontation with the one end portion of the second housing. With this structure, even if the first housing moves toward the second housing due to accidental application of external force, the second elastic member can prevent the first housing from directly coming into abutment with the one end portion of the second housing.

Preferably, the large diameter portion has a generally hollow cylindrical shape having an outer peripheral surface, the large diameter portion having an attachment portion on the outer peripheral surface, the elastic member being attached to the attachment portion; the second housing has an engagement portion with which the elastic member is engaged in a state where the second housing is connected to the large diameter portion; and the elastic member has a circular cross-section taken along a plane extending in a radial direction thereof. With this structure, the second housing can be securely connected to and supported by the first housing. Even if the second housing moves in a direction away from the first housing due to the accidental application of external force, the elastic member rotationally moves in a space between the first housing and the second housing with being in contact with the first housing and the second housing. Hence, fracturing of the elastic member can be avoided.

Further, the large diameter portion may include a terminal portion electrically connected to the load portion, and the one end portion of the second housing may include a terminal portion electrically connected to the battery pack. The terminal portion of the second housing and the terminal portion of the first housing are configured to be electrically connected to each other when the second housing is connected to the large diameter portion.

With this structure, vibration generated due to driving of the load portion is less likely to be transmitted to a portion where the first housing and the second housing are electrically connected to each other. Hence, frictional wearing of the terminal portion at the large diameter portion and the terminal portion at the second housing due to vibration can be restrained.

An electric device according to the present invention includes a first housing, a second housing, and an elastic member. The first housing includes: a load accommodating portion accommodating therein a load portion that consumes an electric power; a handle portion connected to the load accommodating portion and configured to be gripped by a user; and a circuit board accommodating portion connected to the handle portion at a position opposite to the load accommodating portion with respect to the handle portion, the circuit board accommodating portion accommodating therein a control portion configured to control the load portion. The second housing has one end portion attached to the circuit board accommodating portion, and another end portion for holding a battery pack. The elastic member is interposed between the circuit board accommodating portion and the one end portion of the second housing for connecting the second housing to the circuit board accommodating portion.

With this structure, since the second housing is connected to the first housing through the elastic member, vibration generated in the load portion due to power consumption is absorbed by the elastic member to restrain transmission of vibration to the second housing. Since the vibration of the second housing can be restrained, vibration of the battery pack attached to the second housing can also be restrained. Further, since the elastic member is positioned adjacent to the circuit board accommodating portion whose dimension tends to be greater than that of the handle portion, stress applied to the elastic member due to vibration can be dispersed to improve durability of the elastic member.

Preferably, the second housing is spaced away from the circuit board accommodating portion only by the elastic member; and the circuit board accommodating portion and the second housing respectively include restricting portions contactable with each other by deformation of the elastic member to prevent the second housing from releasing from the first housing. With this structure, while the first housing and the second housing are maintained to be spaced away from each other, the first housing and the second housing are bought into direct contact with each other when accidental external force is applied to the first housing or the second housing, for example when the electric device is dropped. Accordingly, the second housing can be prevented from being separated from the first housing.

Preferably, the restricting portions are positioned away from the elastic member. With this structure, even if the position of the second housing relative to the first housing is urged to be changed due to deformation of the elastic member caused by the accidental application of external force, the first housing and the second housing come into contact with each other through the restricting portions to stop further movement of the second housing relative to the first housing. Accordingly, release of the second housing from the first housing can be avoided.

Preferably, a second elastic member may be provided so as to be interposed between the one end portion of the second housing and a confronting portion of the circuit board accommodating portion in confrontation with the one end portion of the second housing. With this structure, even if the first housing moves toward the second housing due to accidental application of external force, the second elastic member can prevent the first housing from coming into direct abutment with the one end portion of the second housing.

Preferably, the circuit board accommodating portion has a generally hollow cylindrical portion whose axis coincides with a direction of connection thereof to the handle portion. The hollow cylindrical portion has an outer peripheral surface having an attachment portion to which the elastic member is attached. Preferably, the second housing has an engagement portion with which the elastic member is engaged in a state where the second housing is connected to the circuit board accommodating portion, and the elastic member has a circular cross-section taken along a plane extending in a radial direction thereof. With this structure, the second housing can be securely connected to and supported by the first housing. Even if the second housing moves in a direction away from the first housing due to the accidental application of external force, the elastic member rotationally moves in a space between the first housing and the second housing while being in contact with the first housing and the second housing. Hence, rupture of the elastic member can be avoided.

Further, the circuit board accommodating portion may include a terminal portion electrically connected to the load portion, and the one end portion of the second housing may include a terminal portion electrically connected to the battery pack. The terminal portion of the second housing and the terminal portion of the circuit board accommodating portion may be configured to be electrically connected to each other when the second housing is connected to the circuit board accommodating portion.

With this structure, vibration generated due to driving of the load portion is less likely to be transmitted to the portion where the first housing and the second housing are electrically connected to each other. Hence, frictional wearing of the terminal portion at the circuit board accommodating portion and the terminal portion at the second housing due to vibration can be restrained.

An electric device according to the present invention includes: a first housing accommodating therein a load portion configured to consume an electric power; a second housing connected to the first housing and to which a battery pack is attachable; and a pivot movement supporting portion configured to allow one of the first housing and the second housing to pivotally move relative to the other one of the first housing and the second housing.

According to the electric device having the above construction, the pivot movement supporting portion allows one of the first housing and the second housing to be pivotally moved relative to the remaining one of the first housing and the second housing when vibration is generated in the first housing during an operation. Hence, transmission of vibration to the battery pack connected to the second housing can be restrained. Therefore, frictional wearing at the connecting portion between the main body of the electric device and the battery pack can be suitably restrained.

Preferably, the pivot movement supporting portion includes: a shaft portion provided at one of the first housing and the second housing; and a support portion provided at remaining one of the first housing and the second housing to pivotally movably support the shaft portion.

With this structure, since one of the first housing and the second housing is allowed to pivot relative to the remaining one of the first housing and the second housing about the shaft portion provided at one of the first housing and the second housing, transmission of vibration to the battery pack connected to the second housing can be restrained. Therefore, frictional wearing at the connecting portion between the main body of the electric device and the battery pack can be suitably restrained.

Preferably, the support portion is formed with a through-hole to pivotally movably support the shaft portion and the through-hole has an inner diameter gradually reduced as extending inward from each open end of the through-hole.

With this structure, one of the first housing and the second housing can be pivotally move in a radial direction of the through-hole relative to the remaining one of the first housing and the second housing. Hence, transmission of vibration to the battery pack connected to the second housing can be restrained, and frictional wearing at the connecting portion between the main body of the electric device and the battery pack can be suitably restrained.

Preferably, the through-hole defines a center in an axial direction thereof, the inner diameter of the through-hole being smallest at the center in the axial direction.

With this structure, the first housing is pivotally movable relative to the second housing about a center portion in the axial direction of the shaft portion as a fulcrum. Hence, transmission of vibration to the second housing can be restrained. Accordingly, frictional wearing at the connecting portion between the main body of the electric device and the battery pack can be suitably restrained.

Preferably, one of the first housing and the second housing includes a first part and a second part in a form of divided halves. The shaft portion extends from the first part and in abutment with the second part, and is formed with a thread hole extending in an axial direction thereof. The abutment between the shaft portion and the second part fixes a position of the second part relative to the first part in the axial direction of the shaft portion.

With this structure, the second part can be fixed to the first part by threadingly engaging a screw with the shaft portion. Further, a boss, which has been provided in a conventional electric device, can be used as the shaft portion, which can restrain increase in number of parts and components.

Preferably, the first housing has a confronting portion in confrontation with the second housing, the confronting portion being formed with an opening; the support portion protrudes toward an interior of the first housing through the opening; and a first elastic member is disposed between the support portion and an inner peripheral surface of the first housing.

With this structure, a posture of the electric device can be properly maintained constant by an urging force of the first elastic member during a non-operational phase where no external force is exerted.

Preferably, a second elastic member is positioned at a confronting portion between the first housing and the second housing.

With this structure, enhanced dust proof performance can be obtained.

Preferably, the first housing includes: a motor housing portion accommodating therein a motor including an output shaft extending in a frontward/rearward direction; and a handle portion extending from the motor housing portion in a direction crossing the motor housing portion. The second housing is preferably connected to the handle portion through the pivot movement supporting portion.

With this structure, transmission of vibration to the battery pack connected to the second housing can be restrained. Hence, frictional wearing at the connecting portion between the main body of the electric device and the battery pack can be suitably restrained.

Preferably, there may be further provided: a control portion accommodated in the second housing; and a connecting wire for electrically connecting the control portion to the motor through the opening.

With this structure, the first housing is pivotally moved relative to the second housing about the shaft portion as the fulcrum so that the first housing does not move away from the second housing in the radial direction of the shaft portion. Accordingly, breaking of the connection wire passing through the opening of the first housing can be restrained, similar to the support portion supporting the shaft portion.

Preferably, the second housing is formed with a through-hole through which the connecting wire extends, and a third elastic member is positioned inside the through-hole.

With this structure, breaking of the connecting wire can be restrained.

Preferably, the pivot movement supporting portion includes: a joint portion which is a discrete member and disposed over the first housing and the second housing; and an elastic member disposed at an outer side of the joint portion. Each of the first housing and the second housing is provided with a protruding portion engaged with the elastic member.

With this structure, transmission of vibration to the battery pack connected to the second housing can be restrained. Hence, frictional wearing at the connecting portion between the main body of the electric device and the battery pack can be suitably restrained.

The present invention further provides an electric device including: a first housing accommodating therein a load portion configured to consume an electric power; a second housing having one end portion connected to the first housing and another end portion to which a battery pack is connectable; a supporting mechanism portion configured to prevent one of the first housing and the second housing from being separated from the other; and an elastic member positioned around the supporting mechanism portion. The first housing includes a first restricting portion constituting the supporting mechanism portion, and the second housing includes a second restricting portion constituting the supporting mechanism portion and engageable with the first restricting portion. The elastic member is disposed around the supporting mechanism portion at a position offset from the first restricting portion and the second restricting portion.

According to the electric device thus constructed, the position of the second housing relative to the first housing is less likely to be affected by deterioration of the elastic member, since the elastic member is positioned remote from a position between the first restricting portion and the second restricting portion. The second housing is thus suppressed from moving freely relative to the first housing. That is, relative displacement between the first and second housings is not likely to occur. Accordingly, the resultant structure can restrain breaking or disconnection of the connecting wire extending over the first housing and the second housing. Further, even if deterioration of the elastic member occurs, separation of the second housing from the first housing can be avoided.

In the above described structure, preferably, one of the first restricting portion and the second restricting portion includes a protruding portion protruding from the one of the first housing and the second housing toward remaining one of the first housing and the second housing; and the remaining one of the first restricting portion and the second restricting portion is formed with a hole for receiving the protruding portion.

With this structure, the second housing can be restricted from being separated from the first housing suitably.

Advantageous Effects of Invention

In the electric device according to the present invention, transmission of vibration to the battery pack can be restrained. Vibration generated in the first housing due to power consumption in the load portion can be suppressed from being transmitted to the second housing to which the battery pack is attached. Accordingly, transmission of vibration to the battery pack can be restrained. Further, release of the second housing from the first housing due to the vibration can be restrained (avoided). Further, enhanced durability of the main body of the electric device can be provided.

Breaking of connecting wire between the main body of the electric device and the battery pack can be avoided.

BRIEF DESCRIPTION OF DRAWINGS

FIG. 3 is an exploded perspective view illustrating a circuit board accommodating portion (large diameter portion), an elastic member, and a second housing in the impact wrench illustrated in FIG. 1;

FIG. 5 is a view illustrating the circuit board accommodating portion (large diameter portion), the second housing, and a battery pack, each being isolated from the others;

FIG. 10 is a perspective view of the housing of the impact wrench according to the second embodiment of the present invention, as viewed from generally below thereof;

FIGS. 15(a)-(b) are views for description of effects of the present invention when vibration with regard to a frontward/rearward direction is generated in the first housing during operation, in which FIG. 15(a) shows a state where the second housing is pivotally moved in a clockwise direction relative to the first housing about an axis of the shaft portion, and FIG. 15(b) shows a state where the second housing is pivotally moved in a counterclockwise direction relative to the first housing about the axis of the shaft portion;

FIGS. 16(a)-(c) are views for description of effects of the present invention when vibration with regard to a leftward/rightward direction is generated in the first housing during operation, in which: FIG. 16(a) shows a reference state where no vibration is generated in a main body of the impact wrench; FIG. 16(b) shows a state where the second housing is pivotally moved in the clockwise direction relative to the first housing about a center point in an axial direction of the shaft portion; and FIG. 16(c) shows a state where the second housing is pivotally moved in the counterclockwise direction relative to the first housing about the center point in the axial direction of the shaft portion;

DESCRIPTION OF EMBODIMENT

Hereinafter, an impact wrench 1 as an example of an electric device according to a first embodiment of the present invention will be described with reference to accompanying drawings.

Figure 1:
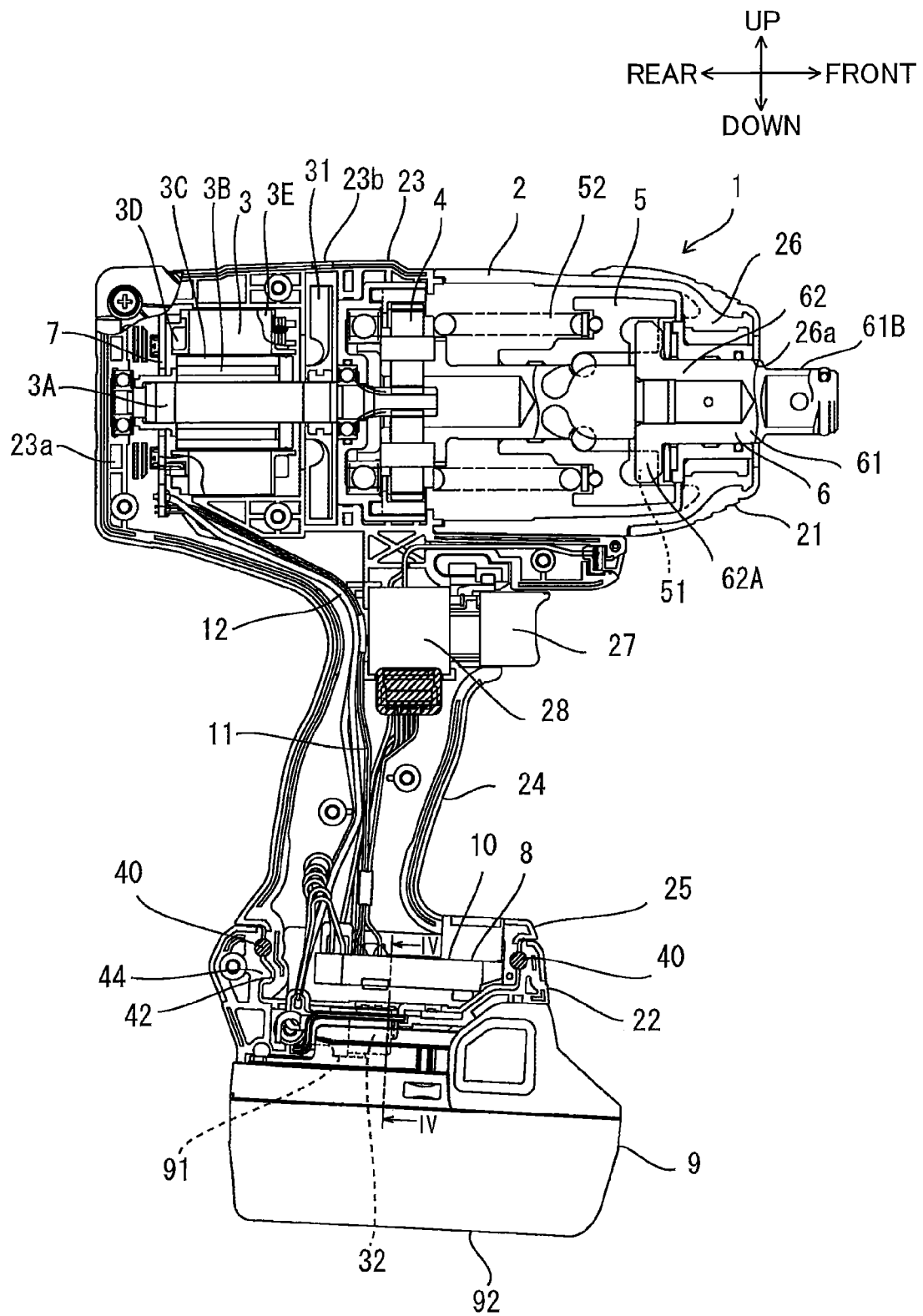
FIG. 1 is a cross-sectional view of an impact wrench according to a first embodiment of the present invention.
Figure 2:
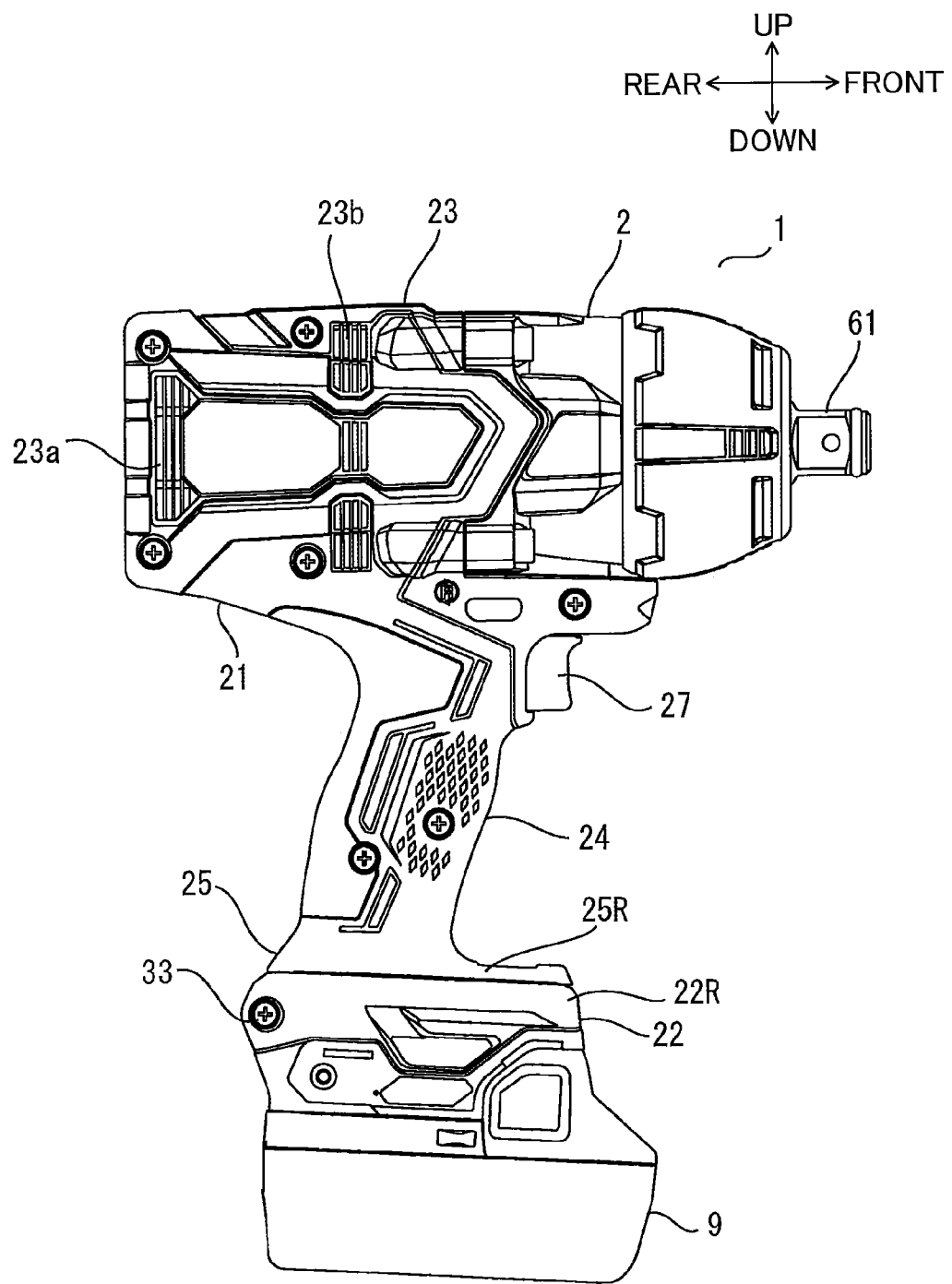
FIG. 2 is a side view of the impact wrench illustrated in FIG. 1.

As illustrated in FIG. 1, the impact wrench 1 mainly includes a housing 2, a motor 3, a gear mechanism 4, a hammer 5, an anvil portion 6, a control portion 8, and a battery pack 9.

The housing 2 is made from resin, and constitutes an outer shell of the impact wrench 1. The housing 2 includes: a first housing 21 accommodating therein the motor 3, the gear mechanism 4, the hammer 5, the anvil portion 6, and the control portion 8; and a second housing 22 connected to the first housing 21. The battery pack 9 is attached to the second housing 22.

The first housing 21 mainly includes a load accommodating portion 23, a handle portion 24 extending from the load accommodating portion 23, and a circuit board accommodating portion 25. The load accommodating portion 23 is generally hollow cylindrical, and accommodates therein the motor 3, the gear mechanism 4, the hammer 5, and the anvil portion 6 in this order. Incidentally, a combination of the motor 3, the gear mechanism 4, the hammer 5, and the anvil portion 6 is an example of a load portion for driving the end bit attached to the anvil portion 6 through the gear mechanism 4 and the hammer 5 by electric power supplied to the motor 3, as described later in detail.

Incidentally, in the following description, a side of the anvil portion 6 will be referred to as a front side, and a side of the motor 3 will be referred to as a rear side. Further, an extending direction of the handle portion 24 from the load accommodating portion 23 will be referred to as a downward direction, and a direction opposite thereto will be referred to as an upward direction. Further, in FIG. 1, a near side will be referred to as a rightward direction, and a far side will be referred to as a leftward direction.

The first housing 21 has a structure of complementary halves separated from each other and mating with each other in a leftward/rightward direction. Similarly, the second housing 22 has a structure of complementary halves separated from each other and mating with each other in the leftward/rightward direction.

A hammer case 26 is positioned frontward of the load accommodating portion 23. The hammer case 25 accommodates therein the hammer 5 and the anvil portion 6 and is made from metal. The hammer case 26 has a generally conical shape whose diameter is gradually reduced toward the front. The hammer case 26 has a front end formed with an opening 26a. The load accommodating portion 23 has a rear end portion formed with a plurality of air inlet ports 23a. The load accommodating portion 23 has a side end portion formed with a plurality of air outlet ports 23b positioned radially outward of a cooling fan 31 described later for discharging intake air to an outside.

The handle portion 24 has a generally hollow cylindrical shape with a diameter capable of being gripped by a user. The handle portion 24 has one end or an upper end connected to the load accommodating portion 23. The handle portion 24 has another end or a lower end connected to the circuit board accommodating portion 25. A trigger 27 is provided at the handle portion 24. The trigger 27 is connected to a switch mechanism 28 accommodated in the handle portion 24. The trigger 27 is configured to supply and shut off electric power to the motor 3. A normal/reverse changeover switch (not illustrated) for switching over a rotational direction of the motor 3 is provided at a connecting portion between the handle portion 24 and the load accommodating portion 23 and immediately above the trigger 27.

The circuit board accommodating portion 25 is generally hollow cylindrical and has a diameter greater than the diameter of the handle portion 24. The circuit board accommodating portion 25 accommodates therein the control portion 8. A terminal portion 29 including a plurality of terminals is positioned at a lower end portion of the circuit board accommodating portion 25. Incidentally, the circuit board accommodating portion 25 is an example of a large diameter portion.

The motor 3 is a brushless motor. The motor 3 includes: an output shaft 3A extending in a frontward/rearward direction; a rotor 3C fixed to the output shaft 3A and having a plurality of permanent magnets 3B; and a stator 3E fixed to the load accommodating portion 23 so as to surround the rotor 3C and having a plurality of coils 3D. The cooling fan 31 is fixed to a front end portion of the output shaft 3A.

The gear mechanism 4 is positioned frontward of the motor 3. The gear mechanism 4 is a deceleration mechanism in a form of a planetary gear mechanism including a plurality of gears to deceleratingly transmit a rotation of the output shaft 3A to the hammer 5.

The hammer 5 has a front end portion provided with a pair of impacting portions 51. The hammer 5 is urged frontward by a spring 52, and is movable rearward against an urging force of the spring 52.

The anvil portion 6 is positioned frontward of the hammer 6. The anvil portion 6 mainly includes an end bit holding portion 61, and an anvil 62. The anvil portion 6 is rotatably supported by the hammer case 26. The end bit holding portion 61 extends frontward to be exposed to the outside from the hammer case 26. The end bit holding portion 61 has a polygonal cross-section, (for example, a rectangular cross-section), and is provided with a chuck 61B having a flat portion to which a non-illustrated socket is attachable.

The anvil 62 is integral with the end bit holding portion 61. The anvil 62 is positioned rearward of the end bit holding portion 61 and is accommodated in the hammer case 26. The anvil 62 includes a pair of counter impact portions 62A positioned symmetrically with each other with respect to a rotational center of the end bit holding portion 61. In accordance with the rotation of the hammer 5, one of the impacting portions 51 impinges one of the counter impact portions 62A, and at the same time, remaining one of the impacting portions 51 impinges remaining one of the counter impact portions 62A. Hence, a rotational force of the hammer 5 is transmitted to the anvil 62, thereby imparting an impacting force to the anvil 62. Further, after impingement between the impacting portions 51 and the counter impact portions 62A, the hammer 5 is rotationally moved rearward against the urging force of the spring 52. When the impacting portions 51 climbs over the respective counter impact portions 62A, the hammer 5 is moved frontward because of release of elastic energy accumulated in the spring 52, thereby again impinging the impacting portions 51 against the counter impact portions 62A.

In the control portion 8, a circuit board 10 is held to the circuit board accommodating portion 25 by ribs 34. A rotational position detecting circuit, a computing portion, and a control signal output circuit those not illustrated are surface-mounted on the circuit board 10 for detecting and controlling the rotation of the motor 3. The control portion 8 is electrically connected, through a ribbon cable 11, to a circuit board 7 positioned rearward of the motor 3 and on which a sensor is surface-mounted. The control portion 8 is also electrically connected to the terminal portion 29 positioned in the circuit board accommodating portion 25. The control portion 8 is configured to control a rotation speed of the motor 3 in accordance with signals from the sensor, i.e., in accordance with an amount of electric energy to be supplied to the motor 3 in response to an operational amount of the trigger 27.

The terminal portion 29 includes the plurality of terminals positioned at a lower side of the circuit board accommodating portion 25. Some of the terminals are electrically connected to the motor 3 through an electric power line 12, and remaining others of the terminals are electrically connected to the control portion 8.

The second housing 22 is hollow cylindrical and has a diameter slightly greater than the diameter of the circuit board accommodating portion 25. The second housing 25 has one end portion or an upper end portion connected to an outer peripheral surface of a large diameter portion of the circuit board accommodating portion 25 via an elastic member 40 having a ring-like configuration. The second housing 25 has another end portion or a lower end portion capable of holding the battery pack 9. The second housing 25 has a front end portion protruding frontward, but the front end portion does not protrudes further forward than the end bit holding portion 61 does. Further, the second housing 22 has a width in the leftward/rightward direction slightly greater than that of the circuit board accommodating portion 25.

The elastic member 40 is made from elastic material such as rubber and silicone resin. The elastic member 40 has a generally circular cross-section taken along a plane extending in a radial direction thereof.

Figure 6A:
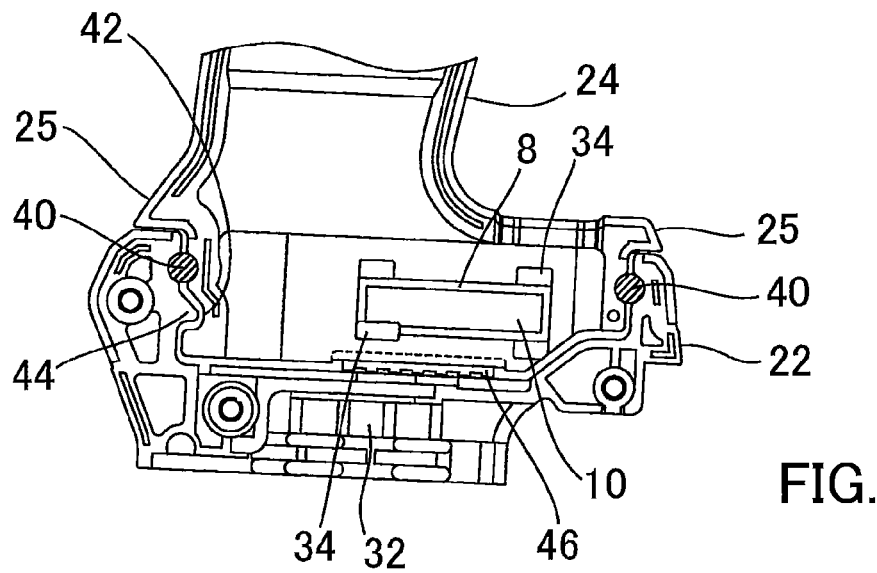
FIG. 6(a) is a cross-sectional view illustrating a connection between the circuit board accommodating portion (large diameter portion) and the second housing.
Figure 6B:
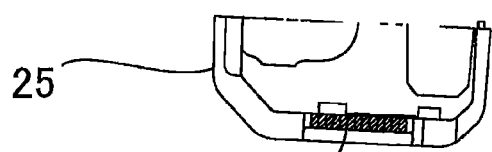
FIG. 6(b) is a vertical cross-sectional view illustrating a second elastic member.
Figure 6C:
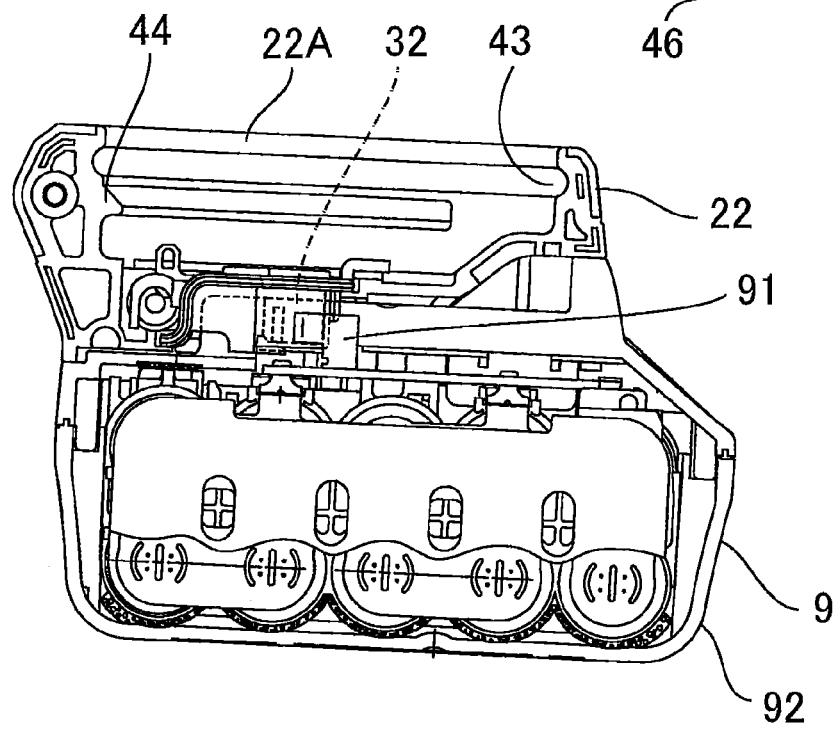
FIG. 6(c) is a cross-sectional view of the second housing to which the battery pack is attached.

As illustrated in FIGS. 5 and 6(c), the battery pack 9 includes a casing 92 made from resin for accommodating therein a plurality of battery cells as secondary cells. The battery pack 9 has one end portion attachable to and detachable from the second housing 22 and provided with a terminal portion 91 including a plurality of terminals for outputting electrical power.

In the impact wrench 1, when a user pulls the trigger 27 while the battery pack 9 is attached to the second housing 22, electrical power supply from the battery pack 9 to the motor 3 is started, and the motor 3 is rotated at a rotation speed responsive to a pulling amount of the trigger 27. Simultaneously, the cooling fan 31 is also rotated to introduce external air through the air inlet ports 23a. The external air cools the circuit board 7 and the motor 3 and is discharged outside through the air outlet ports 23b. The rotation of the motor 3 causes the hammer 5 to impinge against the anvil 62 to rotate the non-illustrated end bit, thereby enabling work and operation using the impact wrench 1. On the other hand, when the user releases the trigger 27, electrical power supply to the motor 3 is shut off, thereby stopping the rotation of the motor 3 to terminate the work and operation.

Next, a connecting structure for connecting the second housing 22 to the first housing 21, and an attachment structure of the battery pack 9 will be described.

Figure 4A:
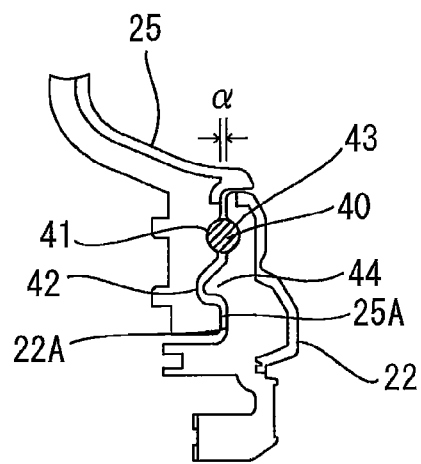
FIG. 4(a) is a view illustrating a connection structure among the circuit board accommodating portion (large diameter portion), the elastic member, and the second housing.

As described above, each of the first housing 21 and the second housing 22 is constituted by complementary halves separable from each other and capable of mating with each other in the leftward/rightward direction. FIG. 3 is an exploded perspective view illustrating: a right accommodating portion 25R and a left accommodating portion 25L which are complementary halves corresponding to the circuit board accommodating portion 25 of the first housing 21; a second right housing 22R and a second left housing 22L corresponding to complementary halves of the second housing 22; and the elastic member 40. Further, FIG. 4(a) is a vertical cross-sectional view illustrating connection of the second housing 22 to the first housing 21 through the elastic member 40.

The circuit board accommodating portion 25 has an outer peripheral surface 25A centered on an axis C of the circuit board accommodating portion 25 extending in an upward/downward direction. An elastic member attachment groove 41 is formed in the outer peripheral surface 25A to extend in a circumferential direction thereof. The elastic member 40 is fittable with the elastic member attachment groove 41. The elastic member attachment groove 41 has a dimension that allows the elastic member 40 to fit therewith with appropriate elastic force maintained in the elastic member 40. The elastic member attachment groove 41 is an example of an attachment portion. Further, the outer peripheral surface 25A has a rear half portion formed with a recessed portion 42 extending in the circumferential direction. The recessed portion 42 is positioned below the attachment groove 41. The recessed portion 42 is an example of a first restricting portion.

As illustrated in FIGS. 5(a) and 6(a), a second elastic member 46 is fixed to a confronting portion of the circuit board accommodating portion 25, the confronting portion facing the second housing 22 and being positioned adjacent to the terminal portion 29. The second elastic member 46 is made from an elastic material such as rubber and silicone resin, as appropriate, and has a flat plate shape as illustrated in FIG. 6(b). The second elastic member 46 is interposed between the circuit board accommodating portion 25 and the second housing 22. Accordingly, the second elastic member 46 prevents the first housing 21 and the second housing 22 from being damaged as a result of direct abutment therebetween that may be caused by displacement of the circuit board accommodating portion 25 toward the second housing 22 upon application of an external force to the first housing 21.

On the other hand, the second housing 22 has an inner peripheral surface 22A with which the outer peripheral surface 25A of the circuit board accommodating portion 25 is fitted by insertion, so that the inner peripheral surface 22A faces the outer peripheral surface 25A from radially outward thereof. The inner peripheral surface 22A is formed with an elastic member insertion groove 43 with which the elastic member 40 is fittable. The elastic member insertion groove 43 is an example of an engagement portion. The inner peripheral surface 22A has a rear portion provided with a protruding portion 44 extending in a circumferential direction thereof. The protruding portion 44 is positioned below the elastic member insertion groove 43. The protruding portion 44 is an example of a second restricting portion.

As illustrated in FIG. 6(c), the second housing 22 is provided with a terminal portion 32 including a plurality of terminals electrically connected to the terminal portion 91 of the battery pack 9, when the battery pack 9 is held by the lower end portion of the second housing 22. The terminal portion 32 is connected to positive and negative terminals in the terminal portion 91 of the battery pack 9, and is configured to receive output signals transmitted from the battery pack 9.

For assembling the impact wrench 1, the motor 3, the gear mechanism 4, the hammer 5 and the anvil portion 5 are received in the halved first housing 21; the control portion 8 is positioned in and fixed to the circuit board accommodating portion 25 by the ribs 34 (see FIG. 5(a)); and electrical wirings are provided between the control portion 8 and the motor 3. Thereafter, the other halved first housing 21 is attached to the halved first housing 21 to complete the assembly of the first housing 21. Then, the elastic member 40 is fitted with the elastic member attachment groove 41 formed in the outer peripheral surface 25A of the circuit board accommodating portion 25; and the halved second housings 22R, 22L are attached to the circuit board accommodating portion 25 such that the elastic member 40 fitted with the attachment groove 41 is received in the elastic member insertion groove 43 of the halved right and left second housings 22R, 22L. Further, the protruding portion 44 of the halved right and left second housings 22R and 22L are butted with the recessed portion 42 of the circuit board accommodating portion 25, and finally the right and left second housings 22R and 22L are fixed to each other by a screw 33. The second housing 22 is thus attached to and supported by the first housing 21 through the elastic member 40.

Figure 4B:
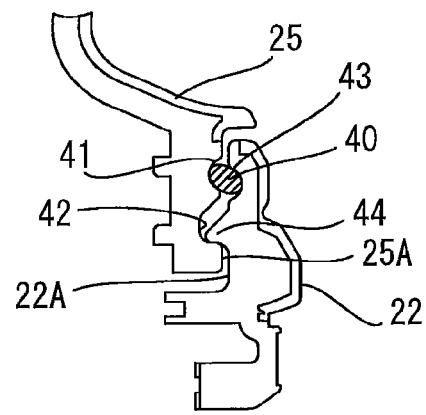
FIG. 4(b) is a view illustrating movement of the second housing in a separating direction relative to the circuit board accommodating portion (large diameter portion).

Such connecting portion between the circuit board accommodating portion 25 and the second housing 22 through the elastic member 40 is illustrated in cross-section in FIG. 4(a). In this state, as illustrated in FIG. 4(a), the protruding portion 44 of the second housing 22 protrudes in the recessed portion 42 of the circuit board accommodating portion 25. Here, direct contact between the protruding portion 44 of the second housing 22 and the recessed portion 42 of the circuit board accommodating portion 25 does not occur providing a minute gap a therebetween. However, when an accidental external force is applied to the housing 2 such as when the impact wrench 1 is dropped down, for example, the second housing 22 may be moved relative to the first housing 21, urging the second housing 22 to be separated from the first housing 21. In such a case, in a case where urged moving length of the second housing 22 relative to the first housing 21 is greater than the gap length α, the protruding portion 44 of the second housing 22 is brought into abutment (engagement) with the recessed portion 42 of the circuit board accommodating portion 25 as illustrated in FIG. 4(b). Hence, separation of the second housing 22 from the first housing 21 can be prevented (avoided). That is, the recessed portion 42 and the protruding portion 44 exhibit a retaining function preventing disengagement of the second housing 22 from the first housing 21. Accordingly, the recessed portion 42 and the protruding portion 44 are examples of restricting portions. Further, since the circuit board accommodating portion 25 and the second housing 22 are connected together through the elastic member 40 with the gap a provided therebetween, the second housing 22 can move relative to the circuit board accommodating portion 25 in all directions by the gap length α. Hence, transmission of vibration from the first housing 21 to the second housing 22 can be effectively restrained.

Further, when the second housing 22 is moved relative to the first housing 21 by application of an accidental external force, the elastic member 40 is compressed in rolling fashion within a space defined by the attachment groove 41 and the insertion groove 43 as illustrated in FIG. 4(b), because the elastic member 40 has a circular cross-section. Consequently, shear fracture does not occur in the elastic member 40, thereby prolonging service life of the elastic member 40.

Further, the terminal portion 32 of the second housing 22 is electrically connected to the terminal portion 91 of the battery pack 9 when the battery pack 9 is attached to the second housing 22, as illustrated in FIG. 6(c). On the other hand, the second housing 22 is connected to the circuit board accommodating portion 25 of the first housing 21 through the elastic member 40, and the terminal portion 91 of the battery pack 9 is indirectly electrically connected to the terminal portion 29 of the circuit board accommodating portion 25 through the second housing 22. Accordingly, as the trigger 27 is pulled, electric power is supplied from the battery pack 9 to the motor 3 to enable work and operation by means of the hammer 5 and the anvil portion 6. Vibration generated at the first housing 21 during operations of the impact wrench 1 can be absorbed in the elastic member 40. Hence, transmission of vibration to the battery pack 9 can be restrained. In this way, transmission of vibration to the portion establishing electrically connection between the second housing 22 and the battery pack 9 is restrained, thereby suppressing frictional wearing of the terminal portion 91 of the battery pack 9 attributed to the vibration. Further, contact failure (chattering) between the terminal portion 91 and the terminal portion 32 can be restrained.

Further, the second housing 22 is not connected to the handle portion 24, but is connected through the elastic member 40 to the outer peripheral surface 25A of the circuit board accommodating portion 25 having the greater diameter than the handle proton 24. Therefore, vibration transmitted to the second housing 22 can be reduced since stress generated by the vibration can be dispersed. Hence, frictional wearing of the terminals constituting the terminal portion 91 of the battery pack 9 attached to the second housing 22 can be prevented, thereby prolonging service life. Further, the elastic member 40 is attached to the outer peripheral surface 25A of the circuit board accommodating portion 25 whose diameter is greater than the diameter of the handle portion 24. That is, the elastic member 40 is attached to a portion whose diameter is not smaller than the diameter of, for example, the handle portion 24. Accordingly, enhanced mechanical strength of the second housing 22 can be provided, and breakage hardly occur at the portion to which the elastic member 40 is attached.

Further, since the control portion 8 is accommodated in the first housing 21, disconnection of electrical wirings, such as the ribbon cable 11 electrically connecting the motor 3 to the control portion 8 can be restrained.

Further, the connecting portion between the first housing 21 and the second housing 22 is positioned away from the handle portion 24. Therefore, a stepped configuration at the connecting portion does not affect user's gripping of the handle portion 24. Hence, operability to the impact wrench 1 can be improved.

Figure 7A:
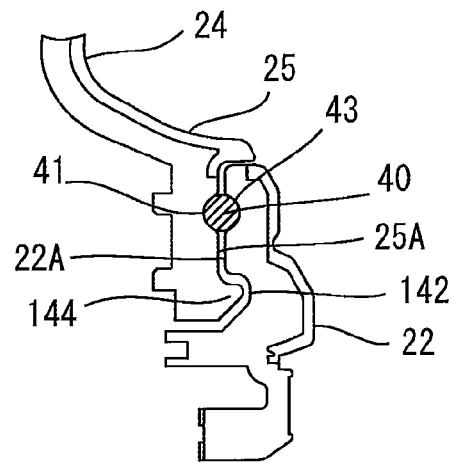
FIGS. 7(a) through 7(c) are views illustrating modifications to a restricting portion.

Incidentally, in the above-described embodiment, the recessed portion 42 is provided at the circuit board accommodating portion 25, and the protruding portion 44 is provided at the second housing 22 such that the protruding portion 44 is in confrontation with the recessed portion 42 with the minute gap therebetween. However, as illustrated in FIG. 7(a), a protruding portion 144 protruding toward the second housing 22 may be provided at the outer peripheral surface 25A of the circuit board accommodating portion 25, and a recessed portion 142 in confrontation with the protruding portion 144 may be provided at the inner peripheral surface 22A of the second housing 22. The structure illustrated in FIG. 7(a) exhibits the same functions and effects as the above-described embodiment.

Figure 7B:
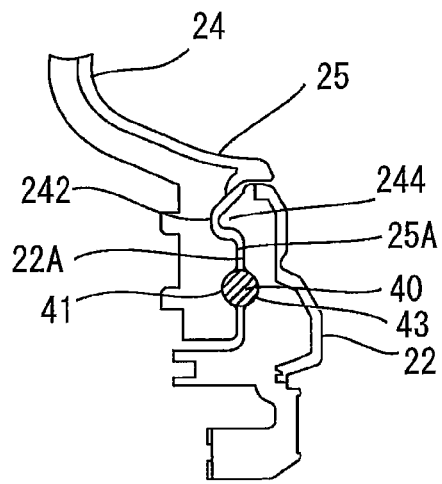
Figure 7C:
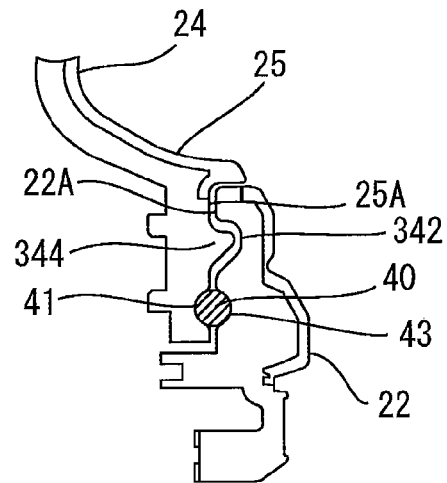

Further, in FIGS. 4(a) and 7(a), the elastic member attachment groove 41 and the elastic member insertion groove 43 for the attachment of the elastic member 40 are positioned above the recessed portion 42 and the protruding portion 44, that is, are positioned closer to the handle portion 24 than the recessed portion 42 and the protruding portion 44 are to the handle portion 24. However, as illustrated in FIG. 7(b), a recessed portion 242 may be provided at the outer peripheral surface 25A of the circuit board accommodating portion 25, and a protruding portion 244 may be provided at the inner peripheral surface 22A of the second housing 22, such that the recessed portion 242 and the protruding portion 244 may be positioned above the attachment groove 41 and the insertion groove 43, i.e., closer to the handle portion 24 than the attachment groove 41 and the insertion groove 43 are to the handle portion 24. The latter structure exhibits the same function and effects as the above-described embodiment. Further, as illustrated in FIG. 7(c), a protruding portion 344 may be provided at the outer peripheral surface 25A of the circuit board accommodating portion 25, and a recessed portion 342 may be provided at the inner peripheral surface 22A of the second housing 22, such that the recessed portion 342 and the protruding portion 344 may be positioned above the attachment groove 41 and the insertion groove 43, i.e., closer to the load accommodating portion 23 than the attachment groove 41 and the insertion groove 43 are to the load accommodating portion 23. The latter structure exhibits the same function and effects as the above-described embodiment in terms of the function to prevent release of the second housing 22 from the first housing 21. That is, the advantageous function of the present invention can be obtained, as long as the elastic member 40 is positioned between the circuit board accommodating portion 25 and the second housing 22 with a gap therebetween, and the elastic member 40 and the protruding portion 44, etc. are positioned away from each other.

Next, an impact wrench 101 as an example of an electric device according to a second embodiment of the present invention will be described with reference to FIGS. 8 through 17. The impact wrench 101 is electrically powered power tool for fastening a fastener (such as a bolt, a nut, a screw, etc.) to a workpiece (such as steel and wood).

In the following description, directions of "upward", "downward", "frontward", and "rearward" will be defined on a basis of FIG. 8. Further, directions of "rightward" and "leftward" will be defined assuming that the impact wrench 101 is observed from a rear side thereof. Further, when referring to dimensions, numerical values, and the like, not only completely identical dimensions, and completely identical numerical values but also approximately the same dimensions, and approximately the same numerical values (accrued due to production errors, for example) should be within the meanings of these words. Similarly, the terms "identical", "perpendicular", "parallel", "coincident", and "flush with", and the like should be construed to encompass the meanings of "approximately the same", "approximately perpendicular", "approximately parallel", "generally coincident", and "approximately flush with".

Figure 8:
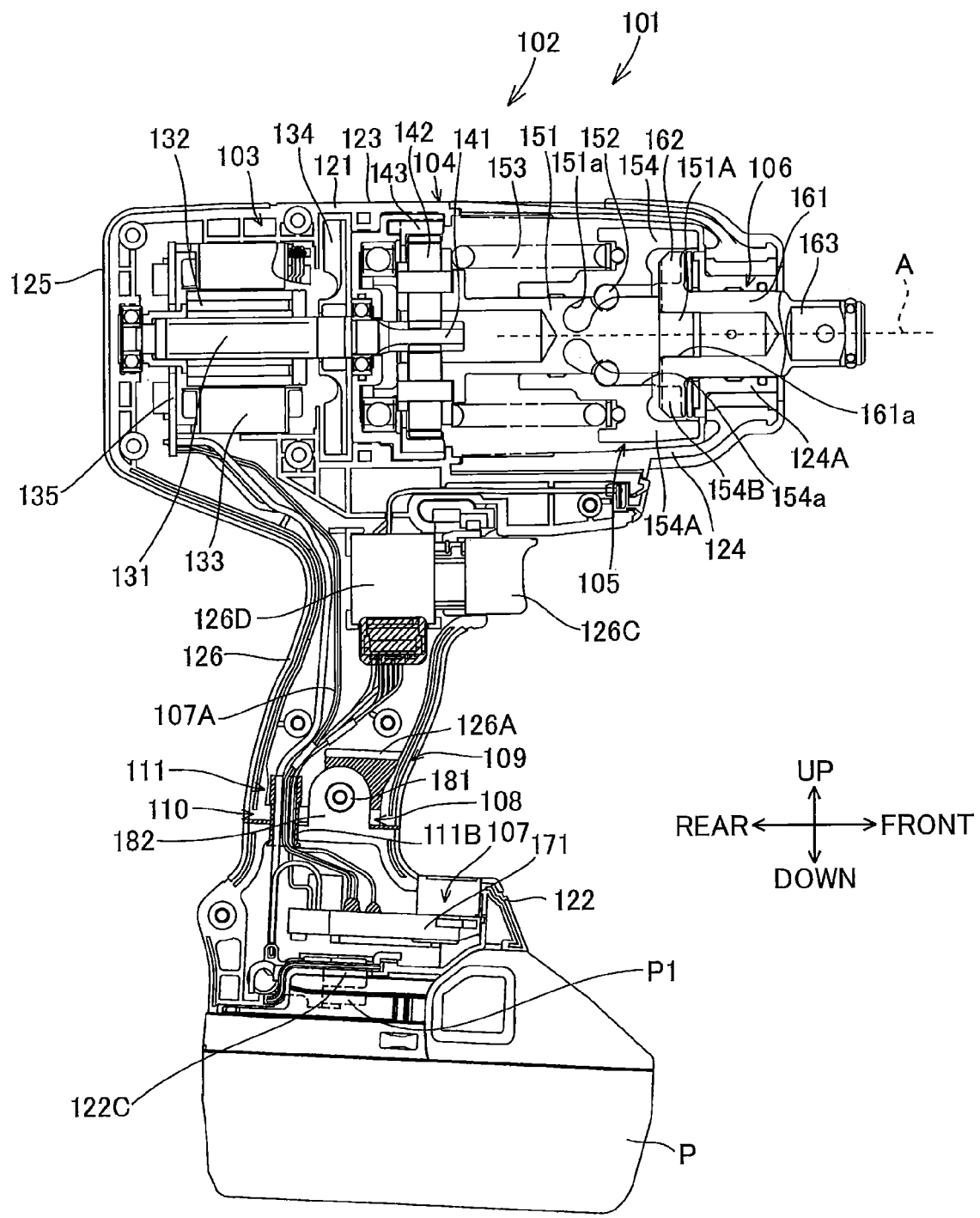
FIG. 8 is a cross-sectional view illustrating an internal construction of an impact wrench according to a second embodiment of the present invention.

As illustrated in FIG. 8, an impact wrench 101 mainly includes a housing 102, a motor 103, a gear mechanism 104, an impact mechanism 105, an anvil 106, a control portion 107, a pivot movement mechanism 108, a first elastic member 109, a second elastic member 110, and a third elastic member 111.

The housing 102 is made from resin, and constitutes an outer shell of the impact wrench 101. As illustrated in FIG. 8, the housing 102 includes: a first housing 121; and a second housing 122 to which a battery pack P including a terminal portion P1 is attachable.

As illustrated in FIG. 8, the first housing 121 constitutes an upper half portion of the housing 102. The first housing 121 includes a main housing 123, and a hammer case 124. The first housing 121 is an example of a "first housing" in the present invention.

Figure 9:
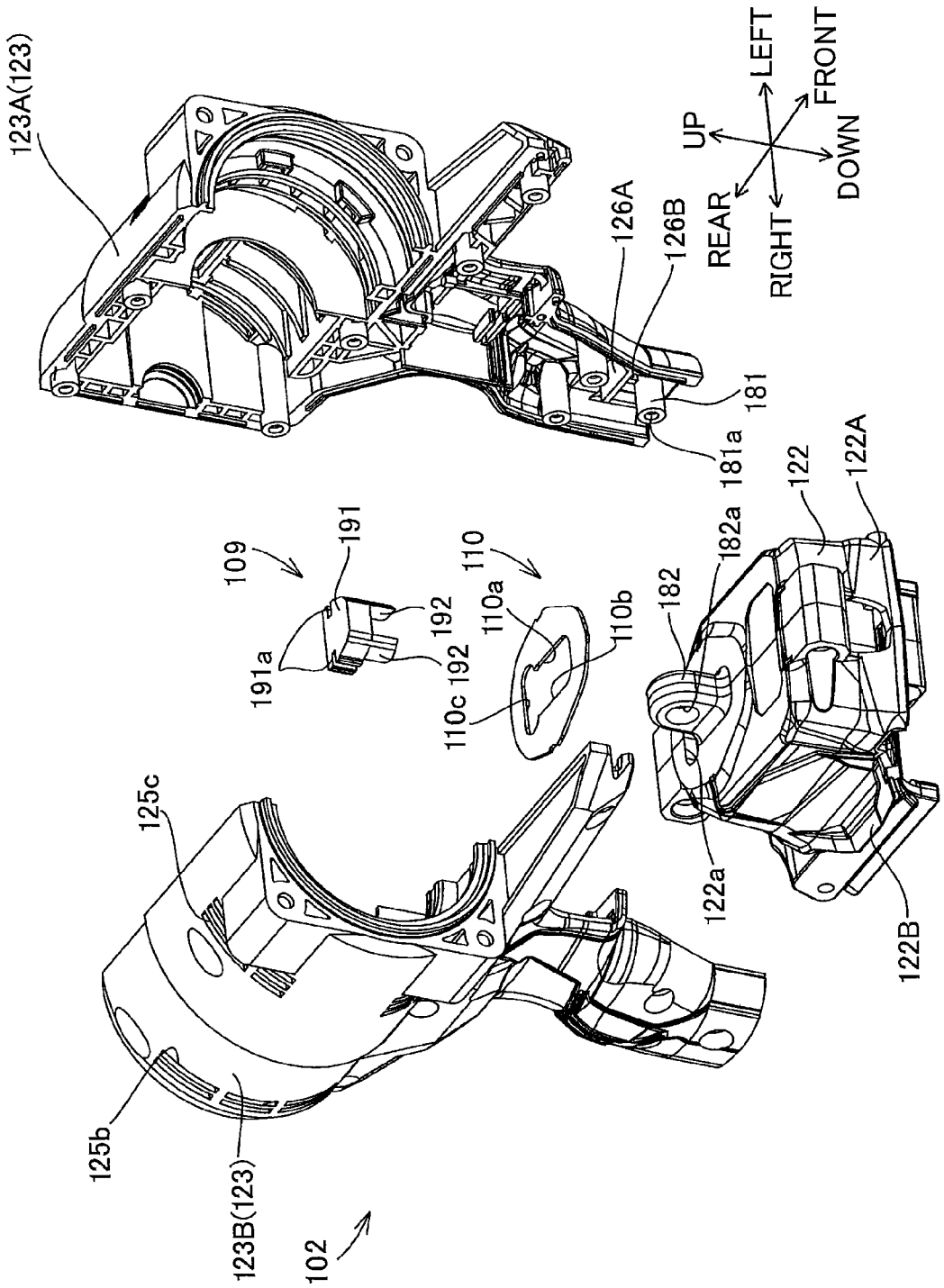
FIG. 9 is an exploded perspective view illustrating a housing, a first elastic member, and a second elastic member in the impact wrench according to the second embodiment of the present invention.

As illustrated in FIG. 9, the main housing 123 (corresponding to the load accommodating portion 23) is in a form of complementary halves separated from and mating with each other in the leftward/rightward direction. The main housing 123 includes a first portion 123A as a left side portion, and a second portion 123B as a right side portion. The first portion 123A and the second portion 123B are halved portions. As illustrated in FIG. 8, the main housing 123 includes a motor housing 125 and a handle portion 126. The first portion 123A is an example of a "first portion" in the present invention, and the second portion 123B is an example of a "second portion" in the present invention.

The motor housing 125 is generally hollow cylindrical and extends in the frontward/rearward direction. The motor housing 125 accommodates the motor 103 therein. Further, the motor housing 125 accommodates therein, in cooperation with the hammer case 124, the motor 103, the gear mechanism 104, the impact mechanism 105, and a part of the anvil 105 in this order. Incidentally, a combination of the motor 103, the gear mechanism 104, the impact mechanism 105, and the anvil 106 is an example of a load portion for driving an end bit attached to the anvil 106 through the gear mechanism 104 and impact mechanism 105 by power supplied to the motor 103. As illustrated in FIG. 9, a plurality of air inlet ports 125b is formed in a side wall of a rear end portion of the motor housing 125 for introducing ambient air. A plurality of air outlet ports 125c is formed in a side wall of a center portion of the motor housing 125 for discharging the intake air to the outside. The motor housing 125 is an example of a "motor housing portion" in the present invention.

The handle portion 126 extends in the upward/downward direction, and is generally hollow cylindrical having a diameter capable of being gripped by a user. In other words, the handle portion 126 extends from the motor housing 125 in a direction crossing the motor housing 125. The handle portion 126 has an upper end portion connected to a lower end portion of the motor housing 125. As illustrated in FIGS. 8 and 9, the handle portion 126 includes a first rib 126A, a second rib 126B, and a trigger 126C. The handle portion 126 is an example of a "handle portion" in the present invention.

As illustrated in FIGS. 8 and 9, the first rib 126A is positioned at a lower portion of the handle portion 126. The first rib 126A protrudes inward from an inner peripheral surface of the handle portion 126. The first rib 126A is generally flat plate shaped and has a flat surface extending horizontally.

As illustrated in FIG. 9, the second rib 126B is positioned at the lower portion of the handle portion 126. The second rib 126B protrudes inward from the inner peripheral surface of the handle portion 126, and extends in the upward/downward direction from a lower surface of the first rib 126A.

The trigger 126C is provided at an upper portion of the handle portion 126. The trigger 126C is connected to a switch mechanism 126D accommodated in the handle portion 126. By manipulating the trigger 126C, whether to supply or shut off electric power to the motor 103 is switchable. A normal/reverse changeover switch (not illustrated) for switching over a rotational direction of the motor 103 is provided at a connecting portion between the handle portion 126 and the motor housing 125 and immediately above the trigger 126C.

Figure 11:
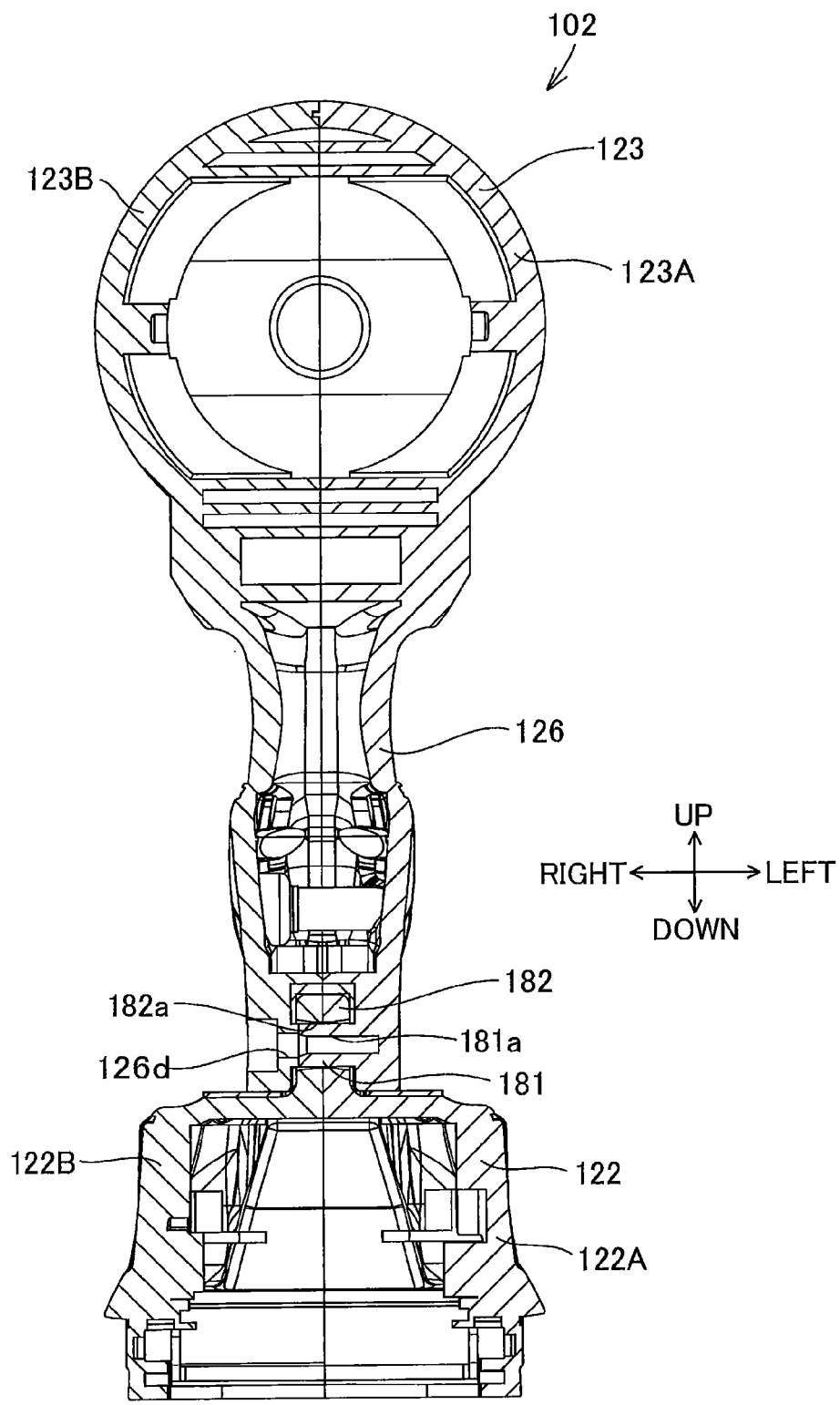
FIG. 11 is a cross-sectional view of the housing and a pivot movement mechanism in the impact wrench according to the second embodiment of the present invention, and the view being taken along a plane extending in a vertical direction and passing through a shaft portion of the pivot movement mechanism.

As illustrated in FIG. 10, the handle portion 126 has a portion that faces the second housing 122. This portion of the handle portion 126 is formed with a through-hole 126a permitting communication between the inside and outside of the first housing 121. The through-hole 126a includes: a first region 126b extending in the frontward/rearward direction and having a generally rectangular shape; and a second region 126c in communication with the first region 126b and having a width in the leftward/rightward direction greater than that of the first region 126b. Further, as illustrated in FIG. 11, a right side portion of the handle portion 126 has a lower end portion where a thread hole 126d extending through the handle portion 126 in the leftward/rightward direction is formed. The through-hole 126a is an example of an opening.

The hammer case 124 illustrated in FIG. 8 is made from metal, and accommodates therein the impact mechanism 105 and a part of the anvil 106. The hammer case 124 has a generally conical shape whose diameter is gradually reduced toward the front. The hammer case 124 has a front end portion formed with an opening with which a bearing metal 124A is fitted.

The motor 103 illustrated in FIG. 8 is a brushless motor. The motor 103 includes a rotation shaft 131, a rotor 132, a stator 133, a fan 134, and a circuit board 135.

The rotation shaft 131 extends in the frontward/rearward direction, and is rotatably supported by the motor housing 125 through a bearing. The rotation shaft 131 is an example of an "output shaft" in the present invention.

The rotor 132 includes a plurality of non-illustrated permanent magnets, and extends in the frontward/rearward direction. The rotor 132 is fixed to the rotation shaft 131 so as to integrally rotate with the rotation shaft 131.

The stator 133 includes a non-illustrated coil. The stator 133 is fixed to the motor housing 125 so as to surround the rotor 132.

The fan 134 is provided at the rotation shaft 131 at a position frontward of a front surface of the rotor 132. The fan 134 is fixed to the rotation shaft 131 so as to integrally rotate with the rotation shaft 131.

The circuit board 135 has an annular shape and is positioned at a rear end portion of the motor 103. On the circuit board 135, an inverter circuit (not illustrated) configured to supply electric power from the battery pack P to the motor 103 and to control the rotation of the motor 103, and a magnetic sensor (not illustrated) configured to detect a rotational position of the rotor 132 are surface mounted.

The gear mechanism 104 includes: a pinion gear 141 positioned at a front end portion of the rotation shaft 131 of the motor 103; a pair of gears 142 in meshing engagement with the pinion gear 141; and an outer gear 143 in meshing engagement with the pair of gears 142. The gear mechanism 104 is a planetary gear mechanism where the pinion gear 141 functions as a sun gear and the pair of gears 142 functions as planetary gears. The gear mechanism 104 is so configured that a rotation of the pinion gear 141 is deceleratingly transmitted to the impact mechanism 105.

As illustrated in FIG. 8, the impact mechanism 105 includes a spindle 151, balls 152, a spring 153, and a hammer 154.

The spindle 151 has an outer peripheral surface formed with two grooves 151a having a generally V-shape. The balls 152 are positioned in the grooves 151a so as to be movable along the grooves 151a in the frontward/rearward direction. The spindle 151 has a front surface from which a protruding portion 151A protrudes frontward.

The spring 153 is a coil spring disposed over the spindle 151. The spring 153 has a front end portion in abutment with the hammer 154 for urging the hammer 154 frontward. The spring 153 has a rear end portion in abutment with the spindle 151.

The hammer 154 is positioned in the hammer case 124 and is rotatable about an axis A extending in the frontward/rearward direction. The hammer 154 includes a body portion 154A and a pair of pawls 154B. The axis A is coincident with a rotation axis of the rotor 132.

The body portion 154A has an inner peripheral surface formed with two grooves 154a extending in a direction of the axis A and recessed radially outwardly. Each groove 154a is positioned in confrontation with each groove 151a of the spindle 151 so as to support the balls 152 in cooperation with each groove 151a. Hence, the hammer 154 is movable relative to the spindle 151 in the frontward/rearward direction and a circumferential direction thereof.

The pair of pawls 154B protrudes frontward from a front surface of the body portion 154A.

As illustrated in FIG. 8, the anvil 106 includes a body portion 161, a pair of blade portions 162, and a mount portion 163.

The body portion 161 extends in the frontward/rearward direction, and has a front end portion fittingly inserted in the bearing metal 124A so as to be rotatably supported by the bearing metal 124A. The body portion 161 is formed with an engagement groove 161a extending in the frontward/rearward direction. The protruding portion 151A of the spindle 151 is inserted in the engagement groove 161a.

The pair of blade portions 162 is integral with the body portion 161. The blade portions 162 are positioned opposite to each other with respect to the axis A in a diametrical direction of the anvil 106.

The mount portion 163 is provided at a front end of the body portion 161, and is exposed to the outside through the opening of the hammer case 124. An non-illustrated end bit is attachable to the mount portion 163.

The second housing 122 constitutes a lower portion of the housing 102. The second housing 122 accommodates the control portion 107 therein. The second housing 122 has an upper end portion connected to the first housing 121 through the pivot movement mechanism 108. The second housing 122 has a lower end portion to which the battery pack P including the terminal portion P1 is detachably attachable. In other words, one end portion of the second housing 122 is connected to the first housing 121, and the other end portion of the second housing 122 is connected to the battery pack P. As illustrated in FIG. 9, the second housing 122 is in the form of complementary halves separated from and mating with each other in the leftward/rightward direction. The second housing 122 includes a first part 122A constituting a left portion of the second housing 122, and a second part 122B constituting a right portion of the second housing 122. The second housing 122 has a rear portion formed with a through-hole 122a providing communication between the inside and outside of the second housing 122. The through-hole 122a has a shape identical to a shape of the second region 126c of the through-hole 126a of the handle portion 126. Hence, the first housing 121 and the second housing 122 are in communication with each other through the second region 126c and the through-hole 122a. Further, as illustrated in FIG. 8, the second housing 122 includes a terminal portion 122C. The second housing 122 is an example of a "second housing", and an example of a "large diameter portion" in the present invention.

The terminal portion 122C includes a plurality of terminals electrically connected to the terminal portion P1 of the battery pack P, when the battery pack P is held by the lower end portion of the second housing 122. The terminal portion 122C is connected to positive and negative terminals in the terminal portion P1 of the battery pack P, and is configured to receive output signals transmitted from the battery pack P.

The control portion 107 is accommodated in the second housing 122, and includes a circuit board 171. A rotational position detecting circuit, a computing portion, and a control signal output circuit those not illustrated are surface-mounted on the circuit board 171 to detect the rotation of the motor 103 and control the motor 103. The circuit board 171 is electrically connected, through a ribbon cable 107A, to the circuit board 135 of the motor 103. The circuit board 171 is also electrically connected to the terminal portion 122C of the second housing 122. The control portion 107 is configured to control a rotation speed of the motor 103 in response to a signal transmitted from the sensor provided at the circuit board 135. Further, the control portion 107 is configured to control the rotation speed of the motor 103 by adjusting electric energy to be supplied to the motor 103 in response to an operational amount of the trigger 126C. The control portion 107 is an example of a "control portion", and the ribbon cable 107A is an example of a "connection line" in the present invention.

Next, the pivot movement mechanism 108, the first elastic member 109, the second elastic member 110, and the third elastic member 111 will be described in detail with reference to FIGS. 8 through 12.

As illustrated in FIG. 8, the pivot movement mechanism 108 (supporting mechanism portion) includes a shaft portion 181 (first restricting portion, protruding portion), and a support portion 182 (second restricting portion). The pivot movement mechanism 108 is an example of a "pivot movement supporting portion" and "supporting mechanism portion" in the present invention.

As illustrated in FIG. 9, the shaft portion 181 is integral with the first part 123A of the main housing 123. The shaft portion 181 has a generally hollow cylindrical shape extending in the leftward/rightward direction from a lower end portion of the handle portion 126. The shaft portion 181 is formed with a thread hole 181a extending in an axial direction thereof. As illustrated in FIG. 11, the thread hole 181a is aligned, in the upward/downward direction, with the thread hole 126d formed at the right side portion of the handle portion 126. The shaft portion 181 is an example of a "shaft portion", a "first restricting portion" and a "protruding portion".

The support portion 182 is integral with the second housing 122. The support portion 182 pivotally movably (rotatably) supports the shaft portion 181. The support portion 182 protrudes toward the inside of the first housing 121 through the through-hole 126a of the handle portion 126. As illustrated in FIGS. 8 and 9, the support portion 182 has a protruding end face curved with a predetermined curvature. As illustrated in FIG. 11, the support portion 182 is formed with a through-hole 182a (hole portion, recessed portion) extending in the leftward/rightward direction. The support portion 182 is an example of a "support portion" and "second restricting portion" in the present invention.

The shaft portion 181 is inserted in the through-hole 182a. Hence, the shaft portion 182 pivotally movably (rotatably) supports the shaft portion 181. The through-hole 182a has left and right ends formed with openings, respectively. The through-hole 182a has an inner diameter that is gradually reduced as extending inward from the respective left and right open ends. The through-hole 182a has a center portion in its axial direction where the smallest inner diameter among the diameters of the through-hole 182a is defined. That is, as illustrated in FIG. 11, the inner peripheral surface of the through-hole 182a is curved in shape such that the center portion of the through-hole 182a has the smallest inner diameter. The through-hole 182a is an example of a "through-hole" and "hole portion" in the present invention.

Incidentally, in the present embodiment, the shaft portion 181 is provided at the first housing 121, and the support portion 182 is provided at the second housing 122. However, the shaft portion 181 may be provided at the second housing 122, and the support portion 182 may be provided at the first housing 121. In other words, the first housing 121 and the second housing 122 may be configured such that one of the first housing 121 and the second housing 122 allows remaining one of the first housing 121 and the second housing 122 to be pivotally movable relative to the one of the first housing 121 and the second housing 122.

The first elastic member 109 is made from rubber, and is positioned between the support portion 182 and the inner peripheral surface of the first housing 121, as illustrated in FIG. 8. With this structure, the impact wrench 101 can suitably maintain a constant posture thereof (for example, the posture illustrated in FIG. 8) during a non-operational state. As illustrated in FIG. 9, the first elastic member 109 includes a main body portion 191 and a pair of protruding portions 192. The first elastic member 109 is an example of a "first elastic member" in the present invention.

As illustrated in FIG. 8, the main body portion 191 has an upper surface extending in the horizontal direction. The main body portion 191 has a lower surface that is recessed substantially upward with a curvature equal to the curvature of the protruding end surface of the support portion 182. Incidentally, FIG. 8 illustrates a cross-section of the first elastic member 109 taken along a plane perpendicular to the leftward/rightward direction and passing through a center of the first elastic member 109 in the leftward/rightward direction. Further, as illustrated in FIG. 9, the main body portion 191 is formed with a pair of grooves 191a extending in the upward/downward direction and positioned symmetrically with each other in the leftward/rightward direction.

The pair of protruding portions 192 is positioned at a front portion of the main body portion 191 to be symmetrical with each other in the leftward/rightward direction. The protruding portions 192 extend downward from the lower surface of the main body portion 191.

The second elastic member 110 is made from rubber. The second elastic member 110 is formed in a thin plate-like shape and is disposed at the portion where the handle portion 126 and the second housing 122 confront each other, as illustrated in FIG. 8. The second elastic member 110 has an upper surface in abutment with a lower surface of the first housing 121, and has a lower surface in abutment with an upper surface of the second housing 122. With this structure, the impact wrench 101 can suitably maintain its constant posture (for example, the posture illustrated in FIG. 8) during a non-operational state. Further, dust-proof performance can be improved at the confronting portion between the first housing 121 and the second housing 122.

As illustrated in FIG. 9, the second elastic member 110 is formed with an insertion hole 110a extending throughout a thickness thereof in the upward/downward direction. The insertion hole 110a has a shape identical to the shape of the through-hole 126a (see FIG. 10) of the handle portion 126. Further, the insertion hole 110a has: a first region 110b having a generally rectangular shape extending in the frontward/rearward direction; and a second region 110c in communication with the first region 110b and having a width in the leftward/rightward direction greater than that of the first region 110b. The second region 110c has a shape identical to the shape of the second region 126c (see FIG. 10) of the through-hole 126 of the handle portion 126 and to the shape of the through-hole 122a of the second housing 122. Incidentally, in a case where the second elastic member 110 is omitted in the present embodiment, the confronting portion between the first housing 121 and the second housing 122 may be constructed to provide a predetermined gap therebetween in the upward/downward direction. The second elastic member 110 is an example of a "second elastic member" in the present invention.

Figure 12:
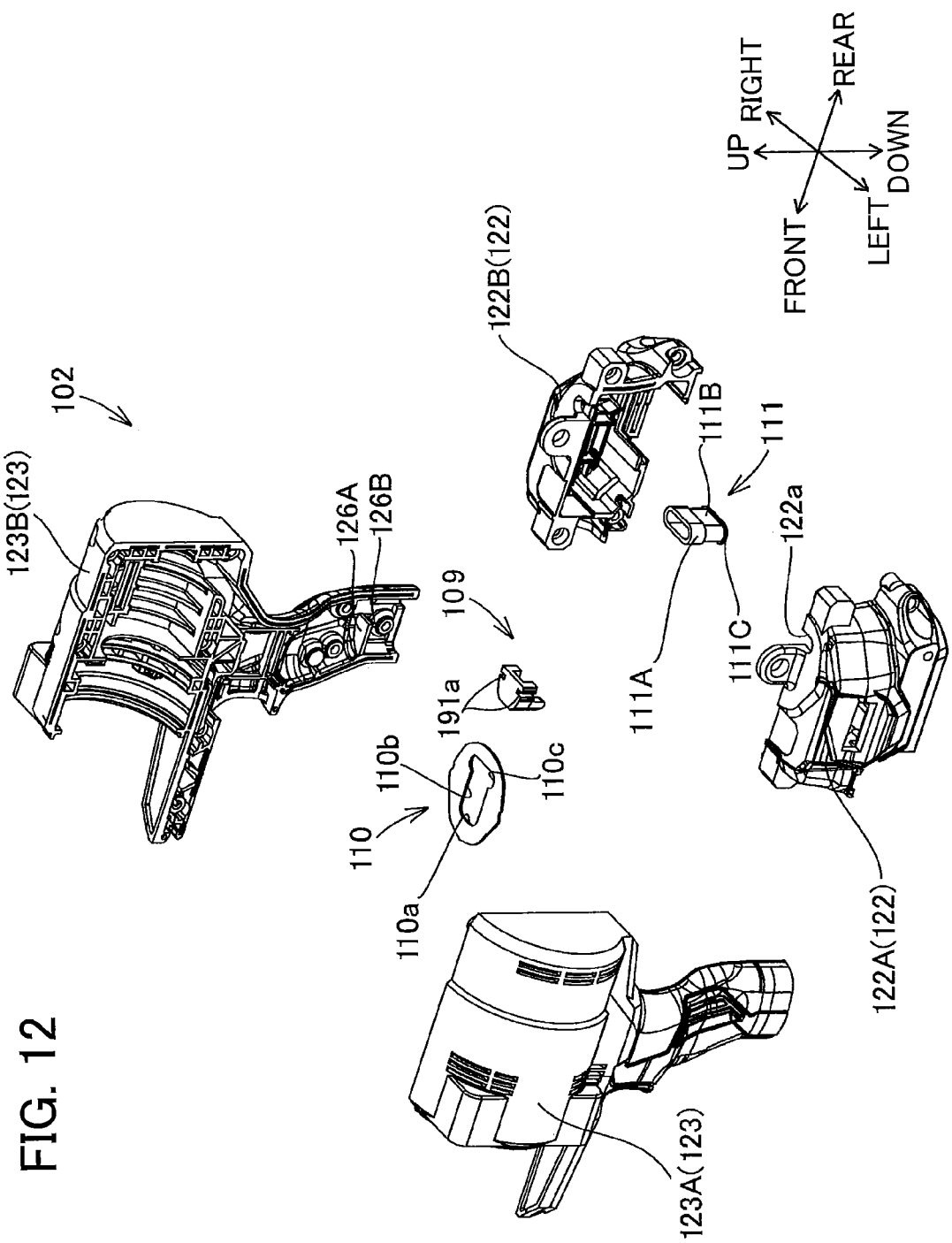
FIG. 12 is a view for description of a process (part 1) of assembling the impact wrench according to the second embodiment of the present invention.

The third elastic member 111 is made from rubber, and has a tubular shape extending in the upward/downward direction, as illustrated in FIG. 8. The third elastic member 111 allows the ribbon cable 107A and other connecting wires to be inserted therethrough. This structure can restrain breaking of the ribbon cable 107A and other connecting wires. As illustrated in FIG. 12, the third elastic member 111 includes a first sleeve portion 111A, a second sleeve portion 111B, and a protruding portion 111C.

The first sleeve portion 111A is tubular in shape extending in the upward/downward direction. The first sleeve portion 111A has an upper end formed with an opening.

The second sleeve portion 111B is tubular in shape extending downward from a lower end of the first sleeve portion 111A. The second sleeve portion 111B has a lower end formed with an opening. The second sleeve portion 111B has a width in the leftward/rightward direction smaller than that of the first sleeve portion 111A, and has a width in the frontward/rearward direction smaller than that of the first sleeve portion 111A. Further, the second sleeve portion 111B has a cross-sectional shape slightly greater than that of: the through-hole 122a of the second housing 122; the second region 110c of the second elastic member 110; and the second region 126c (see FIG. 10) of the handle portion 126.

The second sleeve portion 111B is fitted in the through-hole 122a, the second region 110c, and the second region 126c.

The protruding portion 111C protrudes radially outwardly from a lower end portion of the second sleeve portion 111B.

Next, a process of assembling the housing 102 of the impact wrench 101 according to the second embodiment will be described with reference to FIGS. 12 through 14.

Firstly, the first part 122A and the second part 122B for the second housing 122 are furnished. The first part 122A and the second part 122B are brought closer to each other with the second sleeve portion 111B of the third elastic member 111 engaged with the halved through-hole 122a of one of the first part 122A and the second part 122B. Then, the first part 122A and the second part 122B are made in contact with each other so as to nip the second sleeve portion 111B between peripheral surfaces defining the through-hole 122a. With this state being maintained, the first part 122A and the second part 122B are fixed to each other so as not to move relative to each other by a plurality of screws (not illustrated).

Figure 13:
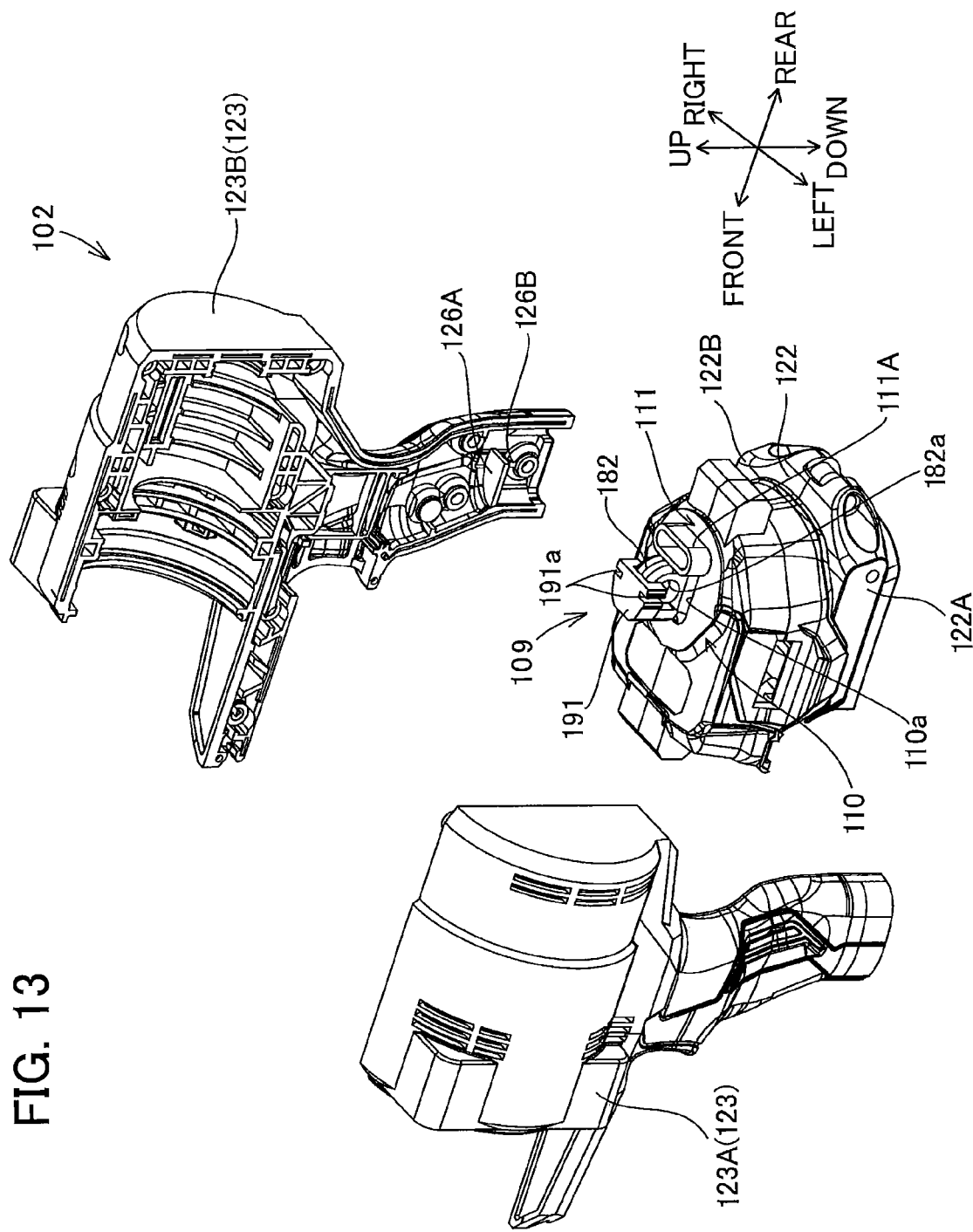
FIG. 13 is a view for description of the process (part 2) of assembling the impact wrench according to the second embodiment of the present invention.
Figure 14:
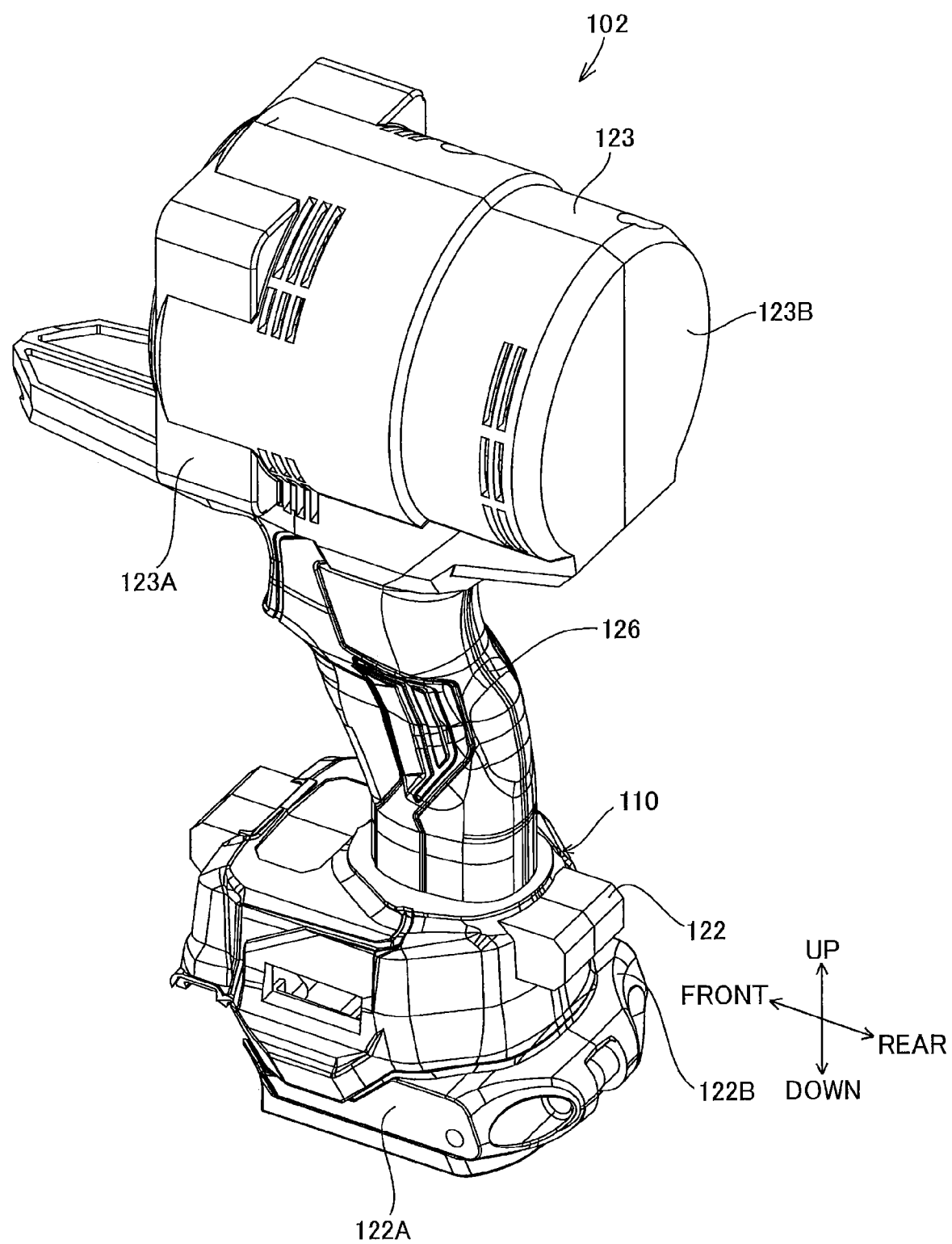
FIG. 14 is a view for description of the process (part 3) of assembling the impact wrench according to the second embodiment of the present invention.

Next, as illustrated in FIG. 13, the second elastic member 110 is disposed. Specifically, the support portion 182 and the first sleeve portion 111A of the third elastic member 111 are inserted into the insertion hole 110a. At this time, the upper surface of the second housing 122 and the lower surface of the second elastic member 110 are brought into abutment with each other.

Subsequently, as illustrated in FIG. 13, the first elastic member 109 is disposed to abut on the support portion 182 from a generally front side thereof. In this state, since the lower portion of the main body portion 191 of first elastic member 109 is recessed upward so as to have the same curvature as the protruding end surface of the support portion 182, the first elastic member 109 can be stably disposed on the second housing 122. Hence, assembling work can be facilitated.

Next, the first part 123A and the second part 123B for the main housing 123 are furnished. The first part 123A and the second part 123B are brought closer to each other. At this time, the shaft portion 181 provided in the first part 123A is inserted into the through-hole 182a formed in the support portion 182. Further, the first part 123A and the second part 123B are brought into abutment with each other with the second rib 126B provided in the handle portion 126 being engaged with the groove 191a formed in the main body portion 191 of the first elastic member 109. In this state, the first part 123A and the second part 123B are fixed to each other without relative movement therebetween by using a plurality of no-illustrated screws (see FIG. 14).

In the present embodiment, as illustrated in FIG. 9, the position of the second part 123B relative to the first part 123A is fixed by the abutment between the shaft portion 181 and the second part 123B, and a non-illustrated screw is threadingly engaged with the thread hole 181a and the thread hole 126d. That is, a boss that has been provided in a conventional impact wrench is used as the shaft portion 181, which can restrain increase in number of parts and components.

Next, a fastening operation employing the impact wrench 101 according to the second embodiment will be described with reference to FIGS. 15 and 16.

Upon rotation of the spindle 151 by the motor 103, the balls 152, the hammer 154 and the anvil 106 are rotated together with the spindle 151 to start a fastening operation to a fastener such as a bolt.

In accordance with an increase in load applied to the anvil 106 due to progress in the fastening operation, the hammer 154 is rotationally retracted against the urging force of the spring 153. At this time, the balls 152 move rearward in the respective grooves 151a. Then, engagement between the hammer 154 and the anvil 106 is released when the pawls 154B climb over the respective blades 162, and the hammer 154 is released from the anvil 106. Then, elastic energy accumulated in the spring 153 is discharged, so that the hammer 154 rotationally moves frontward through the balls 152 relative to the spindle 151. Hence, one of the pawls 154B of the hammer 154 collides with one of the blades portions 162 of the anvil 106, and simultaneously, remaining one of the pawls 154B collides with remaining one of the blade portions 162, thereby engaging the hammer 154 and the anvil 106 with each other. Accordingly, impact force is imparted on the blade portions 162.

After the collision of the pawls 154B with the blade portions 162, the hammer 154 is rotationally retracted against the urging force of the spring 153. When the pawls 154B climb over the respective blade portions 162, the engagement between the hammer 154 and the anvil 106 is released to separate the hammer 154 from the anvil 106. Then, elastic energy accumulated in the spring 153 is discharged, so that the hammer 154 rotationally moves frontward. Hence, the pawls 154B again collide with the respective blade portions 162, so that rotational force of the hammer 154 and the spring 153 is transmitted to the anvil 106. In this way, the anvil 106 rotates together with the end bit attached to the mount portion 163 by the rotational impact of the hammer 154. The impact wrench 101 thus performs the operation for fastening the fastener such as the screw and the bolt by means of the end bit.

Next, advantageous effects during the operations by the impact wrench 101 according to the second embodiment will be described in detail in comparison with a conventional impact wrench 900 illustrated in FIG. 19.

Figure 19:
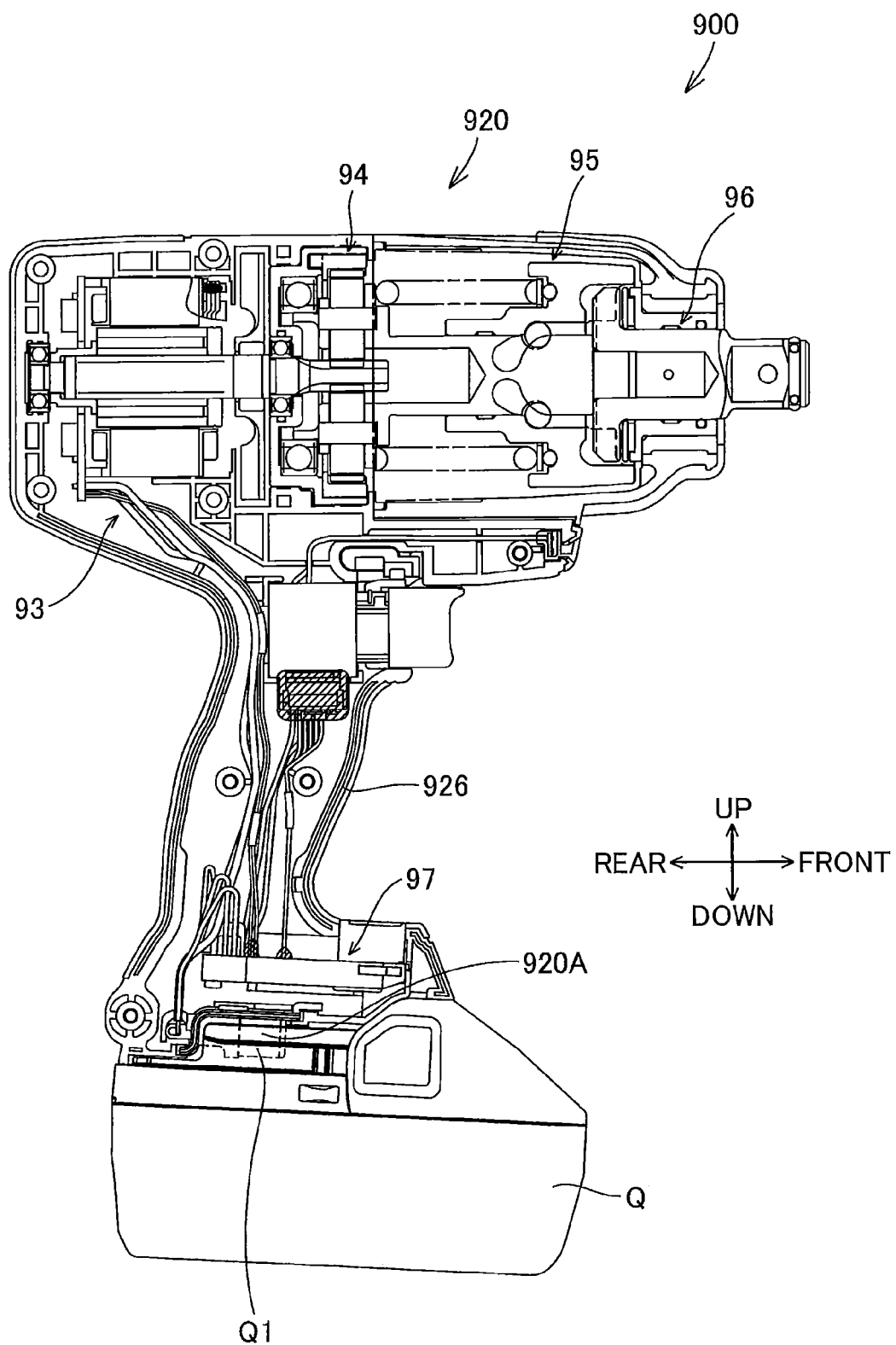
FIG. 19 is a cross-sectional view illustrating an internal construction of an impact wrench according to a comparative example.

The impact wrench 900 according to the comparative example illustrated in FIG. 19 includes a housing 920. The housing 920 accommodates therein a motor 93, a gear mechanism 94, an impact mechanism 95, and an anvil 96 those constituting a load portion. The housing 920 includes a handle portion 926 constituting a lower portion of the housing 920. The handle portion 926 has a lower portion in which a control portion 97 is accommodated, and has a lower end portion provided with a terminal portion 920A electrically connectable to a terminal portion Q1 of a battery pack Q.

The impact wrench 900 according to the comparative example is different from the impact wrench 101 according to the second embodiment in that: the housing 920 is not divided into upper and lower housings; and a mechanism corresponding to the pivot movement mechanism 108 is not provided in the impact wrench 900. Hence, in a case where vibration is generated in the housing 920 due to the driving of the load portion, the vibration may be transmitted directly to the battery pack Q, which leads to frictional wearing and damage to the terminal portion 920A of the impact wrench 900 and to the terminal portion Q1 of the battery pack Q.

In contrast, in the impact wrench 101 according to the present embodiment, since the pivot movement mechanism 108 is provided to allow the first housing 121 to be pivotally moved relative to the second housing 122, transmission of vibration to the second housing 122 can be restrained. In other words, since the pivot movement mechanism 108 allows the first housing 121 to pivotally move relative to the second housing 122, transmission of vibration to the second housing 122 can be restrained.

Specifically, as illustrated in FIG. 15, in a case where vibration is generated in the first housing 121 in the frontward/rearward direction due to the driving of the load portion, the first housing 121 can be pivotally moved in the frontward/rearward direction relative to the second housing 122 about an axis of the shaft portion 181, so that transmission of vibration to the second housing 122 can be restrained. More specifically, as illustrated in FIG. 15(*a*), in a case where load urging the first housing 121 to pivotally move in a counterclockwise direction in FIG. 15 is imparted on the first housing 121, the second housing 122 pivotally moves in a clockwise direction in FIG. 15 (the direction indicated by an arrow in FIG. 15(*a*)) about the axis of the shaft portion 181. Further, as illustrated in FIG. 15(*b*), in a case where load urging the first housing 121 to pivotally move in the clockwise direction in FIG. 15 is imparted on the first housing 121, the second housing 122 pivotally moves in the counterclockwise direction in FIG. 15 (the direction indicated by an arrow in FIG. 15(*b*)) about the axis of the shaft portion 181. Hence, vibration directing toward the second housing 122 can be shut off, and accordingly, frictional wearing of the terminal portion 122C of the impact wrench 101 and the terminal portion P1 of the battery pack P can be restrained. Incidentally, in contrast to FIG. 8, a right side surface of the first elastic member 109 is illustrated in FIG. 15.

Further, as illustrated in FIG. 16, in a case where vibration in the leftward/rightward direction is generated in the first housing 121 due to driving of the load portion accommodated in the first housing 121, the first housing 121 can be pivotally moved in the leftward/rightward direction about the center portion of the shaft portion 181 in the axial direction, as a fulcrum. Hence, transmission of vibration to the second housing 122 can be restrained. The through-hole 182*a* of the support portion 182 is curved such that the inner diameter of the through-hole 182*a* is gradually reduced toward the center portion from each end thereof in the leftward/rightward direction, as illustrated in FIG. 11, such that the center portion of the through-hole 182*a* has the smallest inner diameter. With this structure, the second housing 122 is smoothly pivotally movable in the leftward/rightward direction. More specifically, assume that load urging the first housing 121 to pivotally move in the counterclockwise direction in FIG. 16(*b*) is imparted on the first housing 121 from a reference state indicated in FIG. 16(*a*). The second housing 122 pivotally moves relative to the first housing 121 in the clockwise direction in FIG. 16 (the direction indicated by an arrow in FIG. 16(*b*)) about the center portion of the shaft portion 181 in the axial direction along a curvature of the inner peripheral surface of the through-hole 182*a*. Further, assume another case where load urging the first housing 121 to pivotally move in the clockwise direction in FIG. 16(*c*) is imparted on the first housing 121 from the reference state indicated in FIG. 16(*a*). The second housing 122 pivotally moves relative to the first housing 121 in the counterclockwise direction in FIG. 16 (the direction indicated by an arrow in FIG. 16(*c*)) along the curvature of the inner peripheral surface of the through-hole 182*a* about the center portion of the shaft portion 181 in the axial direction. With this structure, the second housing 122 can be smoothly pivotally moved in the leftward/rightward direction, leading to suppression of frictional wearing of the terminal portion 122C of the impact wrench 101 and the terminal portion P1 of the battery pack P.

Further, according to the present embodiment, the first housing 121 pivotally moves about the shaft portion 181 relative to the second housing 122. This implies that the first housing 121 does not move away from the second housing 122 in the radial direction of the shaft portion 181. Therefore, breaking of the connecting wires extending through the through-hole 126*a* of the first housing 121 can be restrained in the same manner as the support portion 182 supporting the shaft portion 181.

Further, in the present embodiment, a gap is allowed to be formed at the confronting portion between the first housing 121 and the second housing 122 in accordance with the pivotal movement of the first housing 121 relative to the second housing 122. With this structure, even if rain water is entered in the housing 102 through the air inlet ports 125*b* of the motor housing 125, the rain water can be discharged outside through the gap, thereby ensuring durability of the main body of the impact wrench 101.

An impact wrench 200 according to a third embodiment of the present invention will be described next with reference to FIGS. 17 and 18. The impact wrench 200 has basically the same structure as the impact wrench 101 according to the second embodiment. Accordingly, descriptions for the same parts and components as the impact wrench 101 will be omitted to avoid duplicating description, and parts and components different from those of the impact wrench 101 will be mainly described.

Figure 17:
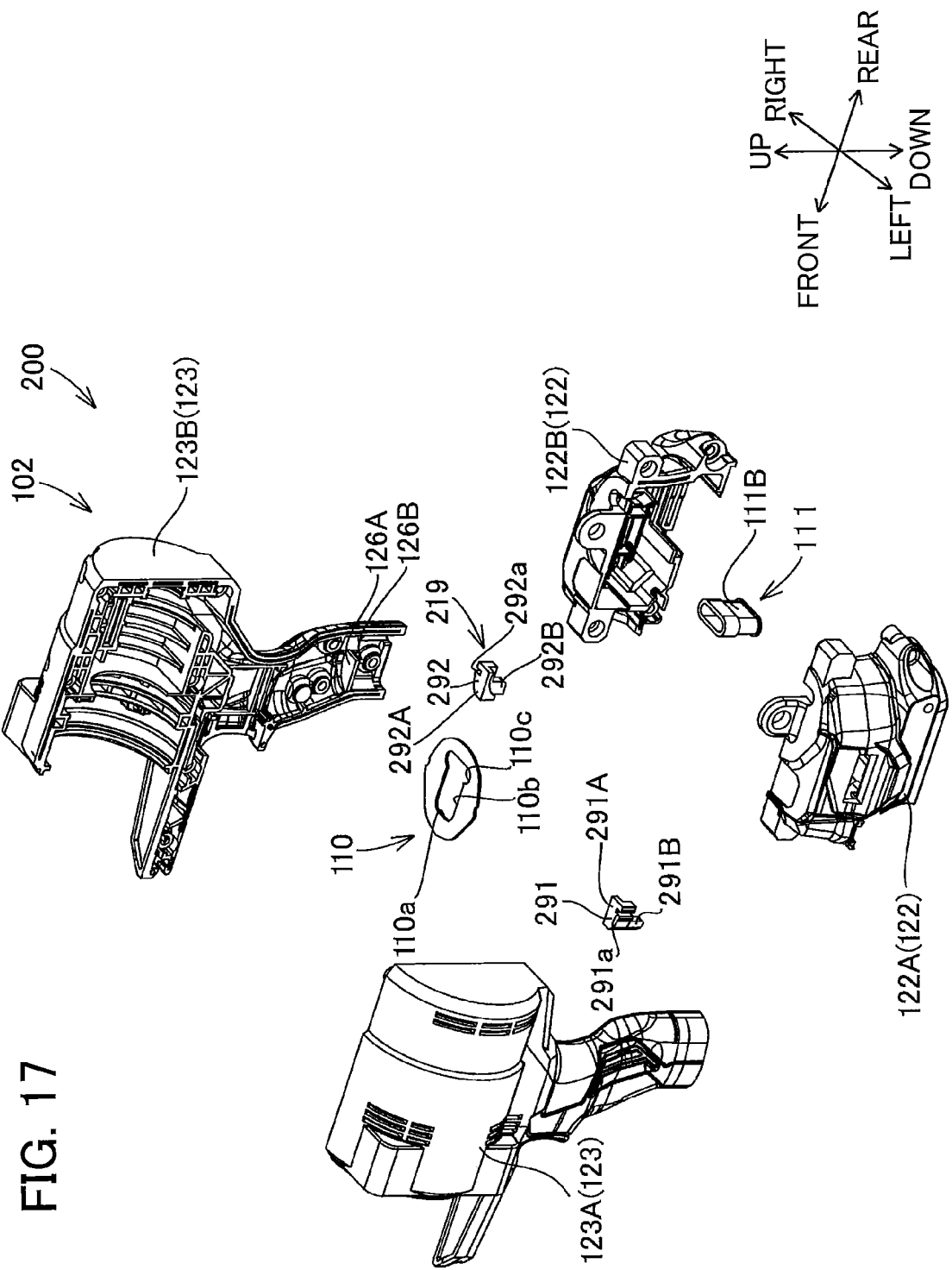
FIG. 17 is a view for description of a process (part 1) of assembling an impact wrench according to a third embodiment of the present invention.

As illustrated in FIG. 17, the impact wrench 200 according to the third embodiment includes a first elastic member 219, instead of the first elastic member 109. Incidentally, other structure of the impact wrench 200 according to the third embodiment is the same as that of the impact wrench 101 according to the second embodiment, and, hence, the third embodiment exhibits effects the same as those of the second embodiment.

The first elastic member 219 includes a left portion 291 and a right portion 292. The first elastic member 219 is an example of the "first elastic member" in the present invention.

As illustrated in FIG. 17, the left portion 291 and the right portion 292 are symmetrical with each other with respect to the leftward/rightward direction. The left portion 291 includes a main body portion 291A and a protruding portion 291B. The right portion 292 includes a main body portion 292A and a protruding portion 292B.

The main body portion 291A is formed with a groove 291*a* extending in the upward/downward direction. The main body portion 292A is formed with a groove 292*a* extending in the upward/downward direction. Further, the main body portions 291A and 292A respectively have upper surfaces perpendicular to the upward/downward direction.

The protruding portion 291B protrudes downward from a lower surface of the main body portion 291A. The protruding portion 292B protrudes downward from a lower surface of the main body portion 292A.

Next, a process of assembling the housing 102 of the impact wrench 200 according to the third embodiment will next be described with reference to FIGS. 17 and 18.

Firstly, as in the second embodiment, the second housing 122 is assembled. Specifically, the first part 122A and the second part 122B are brought into abutment with each other so as to nip the second sleeve portion 111B of the third elastic member 111 between the peripheral surfaces defining the through-hole 122*a* of the second housing 122. In this state, the first part 122A and the second part 122B are fixed to each other so as not to make any relative movement therebetween by a plurality of non-illustrated screws.

Next, similar to the second embodiment, the second elastic member 110 is disposed. Specifically, the support portion 182 and the first sleeve portion 111A of the third elastic member 111 are inserted into the insertion hole 110a. At this time, the upper surface of the second housing 122 and the lower surface of the second elastic member 110 are brought into abutment with each other.

Figure 18:
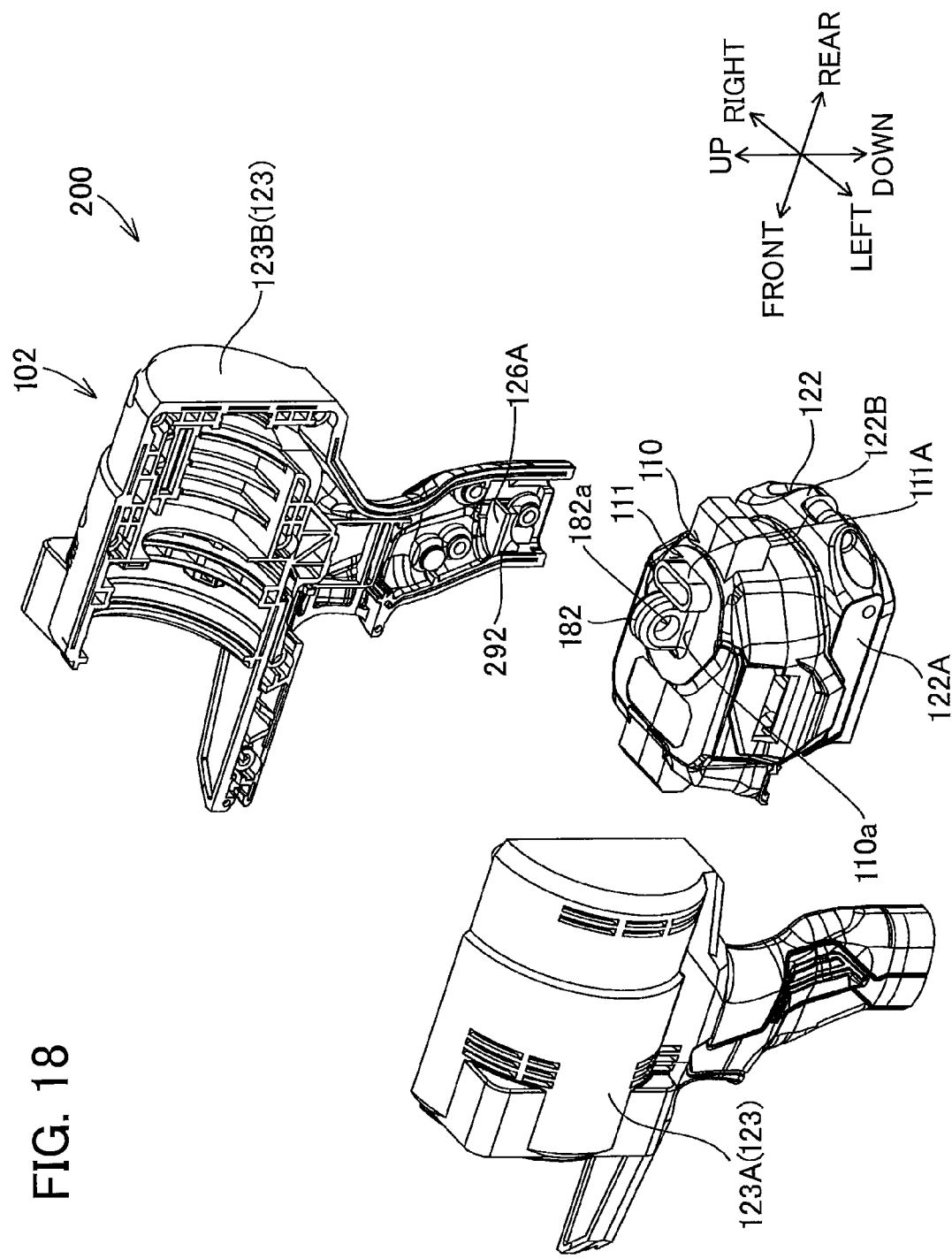
FIG. 18 is a view for description of the process (part 2) of assembling the impact wrench according to the third embodiment of the present invention.

Subsequently, as illustrated in FIG. 18, the right portion 292 of the first elastic member 219 is disposed on the second part 123B of the main housing 123. Further, although not illustrated, the left portion 291 of the first elastic member 219 is disposed on the first part 123A of the main housing 123.

Specifically, while the lower surface of the first rib 126A of the second part 123B and the upper surface of the right portion 292 are in sliding contact with each other, the groove 292a of the right portion 292 and the second rib 126B of the second part 123B are brought into engagement with each other for positioning the right portion 292 to the second part 123B. Further, although not illustrated, while the lower surface of the first rib 126A of the first part 123A and the upper surface of the left portion 291 are in sliding contact with each other, the groove 291a of the left portion 291 and the second rib 126B of the first part 123A are brought into engagement with each other for positioning the left portion 291 to the first part 123A.

Next, the first part 123A and the second part 123B are brought closer to each other. At this time, the shaft portion 181 provided in the first part 123A is inserted into the through-hole 182a formed in the support portion 182. In this state, the first part 123A and the second part 123B are fixed to each other without relative movement therebetween by using a plurality of non-illustrated screws.

Upon assembly of the housing 102, the first elastic member 219 has a configuration identical to that of the first elastic member 109 of the impact wrench 101 according to the second embodiment, and exhibits the same effects as the second embodiment. That is, the first elastic member 219 is disposed between the support portion 182 and the inner peripheral surface of the first housing 121, so that the impact wrench 101, 200 can suitably maintain its constant posture (for example, the posture illustrated in FIG. 8) while being not used. Further, the first elastic member 109, 219 is positioned at the outer peripheral surface of the pivot movement mechanism 108, that is, at a position offset from a portion between the shaft portion 181 and the through-hole 182a. In other words, the first elastic member 109, 219 is not positioned between the outer peripheral surface of the shaft portion 181 and the inner peripheral surface of the through-hole 182a, but is positioned remote from the shaft portion 181 and the through-hole 182a. With this structure, the position of the second housing 122 relative to the first housing 121 is less likely to be affected by degradation of the elastic member. Accordingly, relative displacement between the first housing 121 and second housing 122 can be restrained, while free movement of the second housing 122 can be curbed, which helps to prevent breaking of the connecting wires extending over the first housing 121 and second housing 122. Further, even if degradation occur in the first elastic member 109, 219, the second housing 122 is prevented from being separated from the first housing 121 by the pivot movement mechanism 108, and further, pivotal movement of the second housing 122 can also be regulated.

In the present description, the impact wrench 1, 101, 200 are exemplified as the electric device. However, the present invention is also applicable, other than the impact wrench, to various electric devices driven by a motor, for example: fastening tools such as a driver and an impact driver; cutting tools such as a circular saw and a jigsaw; grinding tools such as a grinder, a sander, and a multitool; boring machines such as a hammer drill; peripheral devices such as a radio, a television, a lantern, and a light; and other electric devices driven by electrical power supply from a battery pack as a power source, such as a cordless nail driving machine. In particular, the present invention is particularly effective for an electric device that is prone to develop vibration.

Further, in the present embodiment, the second elastic member 110 has the plate-like shape, and has a uniform thickness in the upward/downward direction. However, a protrusion may be formed in the flat portion, and the thickness may be thicker than that of the present embodiment. Further, the shape of the second elastic member 110 may be changed arbitrarily depending on amplitude of vibration to be generated in the electric device.

Figure 20:
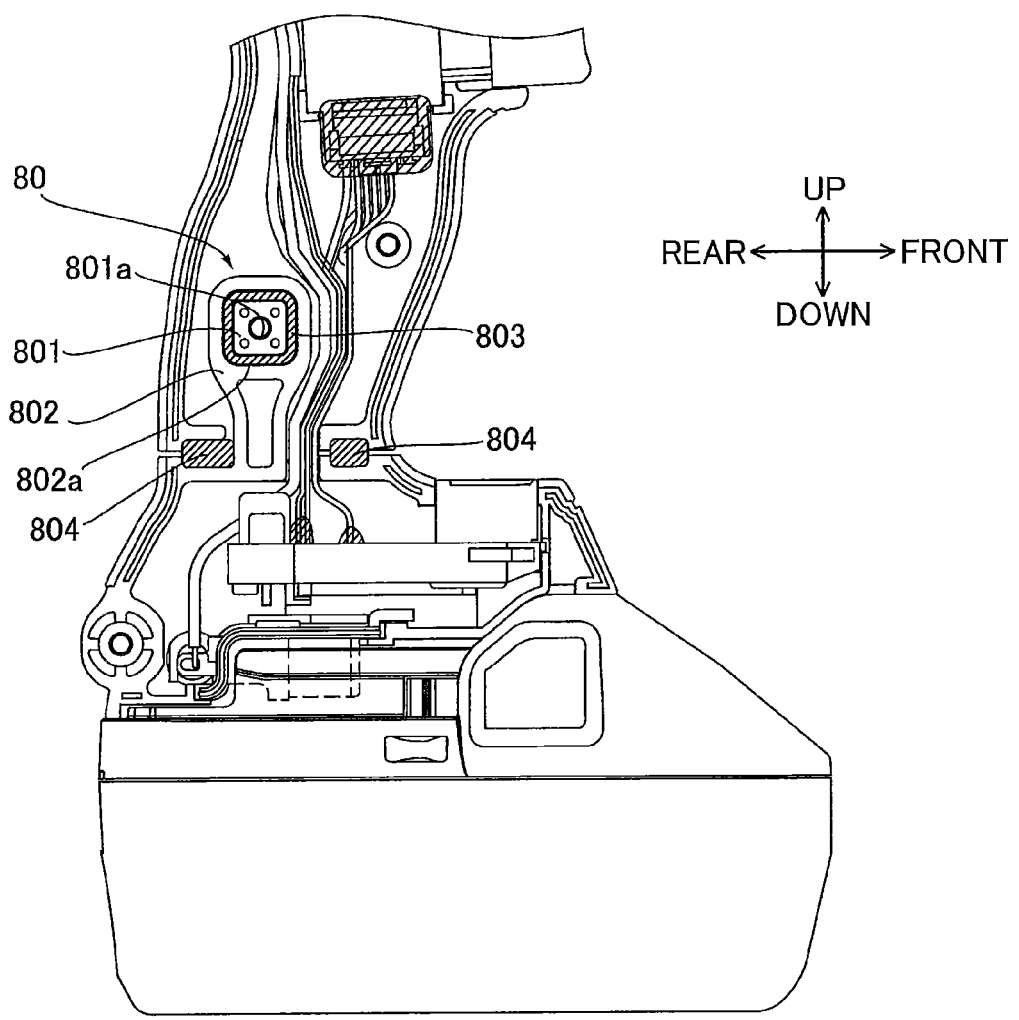
FIG. 20 is a cross-sectional view illustrating an internal construction of an impact wrench according to a fourth embodiment of the present invention.
Figure 21:
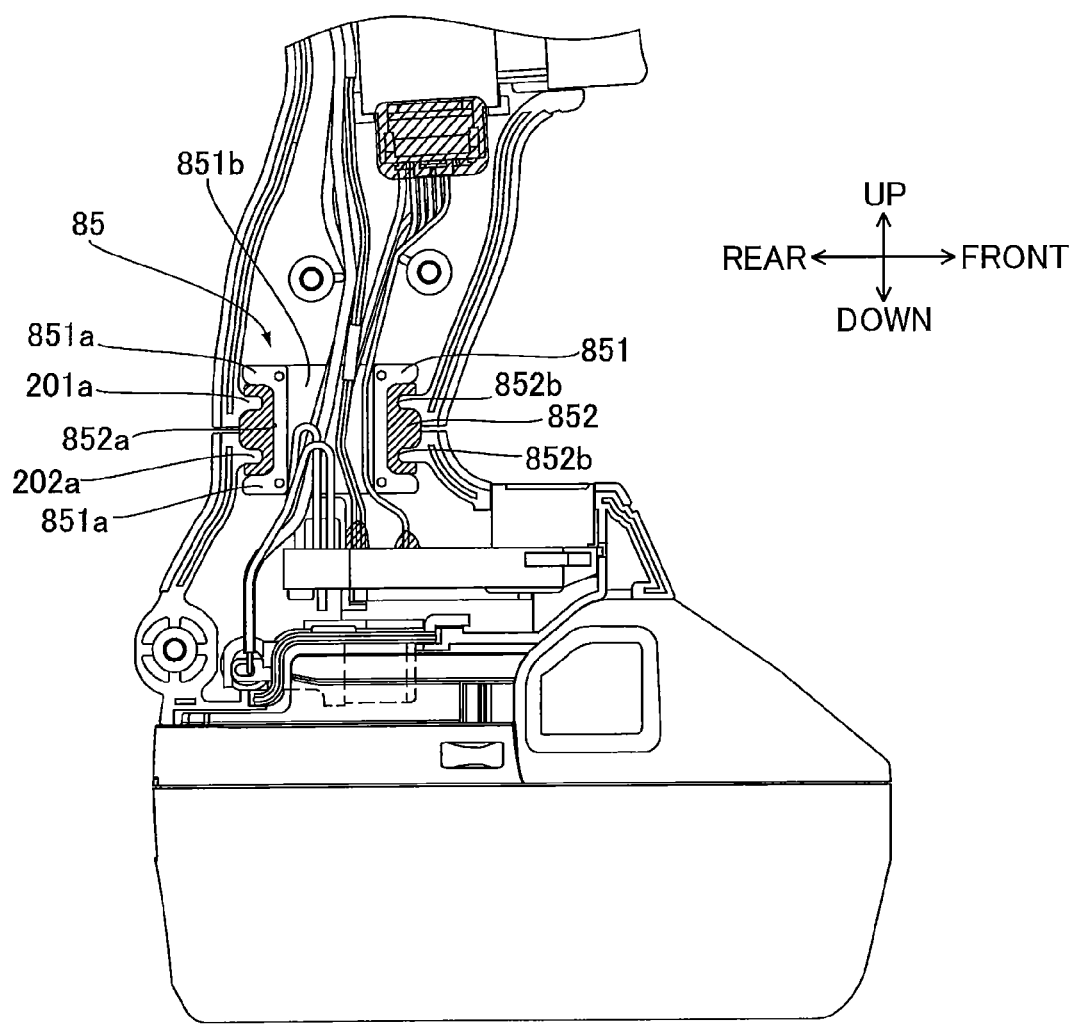
FIG. 21 is a cross-sectional view illustrating an internal construction of an impact wrench according to a fifth embodiment of the present invention.
Figure 22:
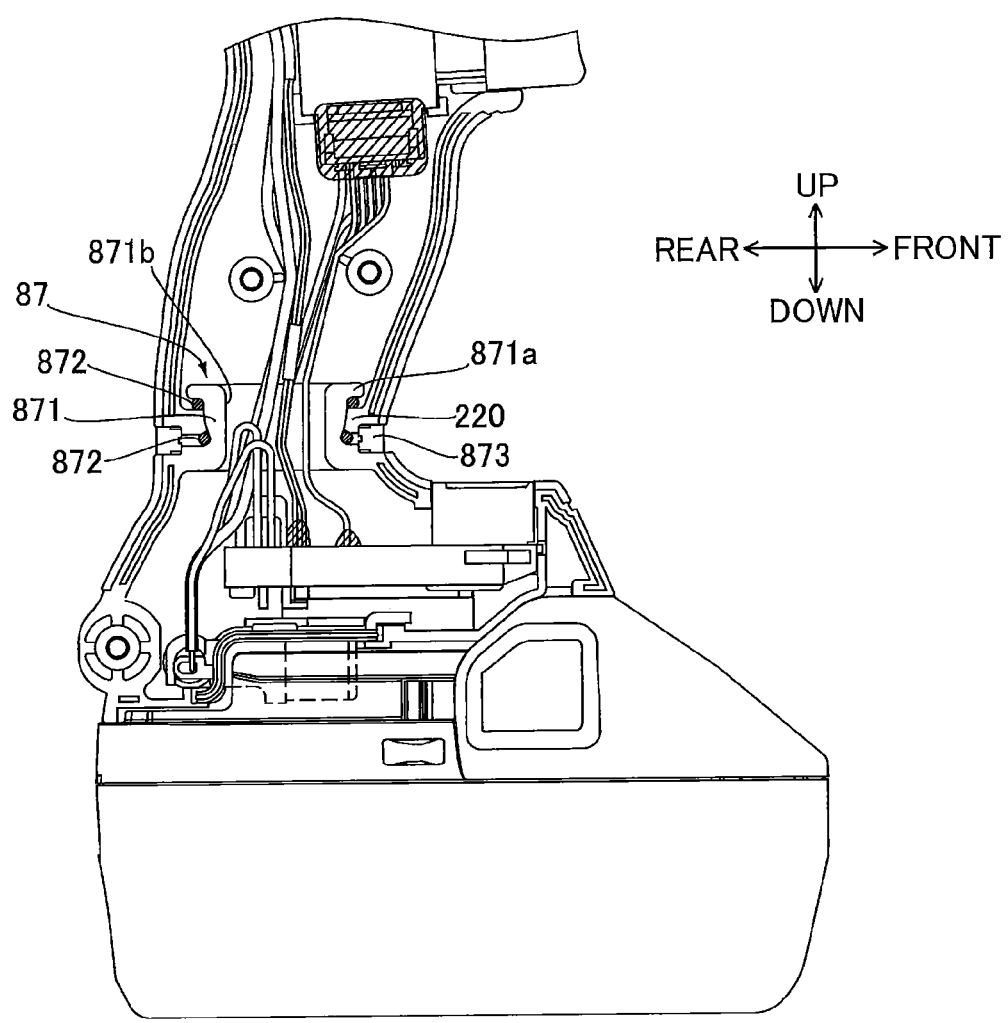
FIG. 22 is a cross-sectional view illustrating an internal construction of an impact wrench according to a sixth embodiment of the present invention.

FIGS. 20 through 22 illustrate still further embodiments for restraining transmission of vibration to the battery pack P. FIG. 20 illustrates a pivot movement mechanism 80 including a shaft portion 801 and a support portion 802. The shaft portion 801 is integral with the first part 123A of the main housing 123, and has a generally rectangular prism shape extending in the leftward/rightward direction. The shaft portion 801 is formed with a thread hole 801a extending in an axial direction thereof. The thread hole 801a is in alignment with a thread hole (not illustrated) formed in the second part 123B of the main housing 123.

The support portion 802 is integral with the second housing 122, and pivotally movably (rotatably) supports the shaft portion 801. The support portion 802 protrudes upward into the interior of the first housing 121 from the upper surface of the second housing 122. The support portion 802 is formed with a through-hole 802a through which the shaft portion 801 extends.

An elastic member 803 is provided inward of an inner peripheral surface of the through-hole 802a and outward of an outer peripheral surface of the shaft portion 801, i.e., between the inner peripheral surface of the through-hole 802a and the outer peripheral surface of the shaft portion 801.

Further, an elastic member 804 is provided between the lower surface of the first housing 121 and the upper surface of the second housing 122. Incidentally, the elastic member 804 may be a one-piece member surrounding the support portion 802, or two-piece members positioned frontward of and rearward of the support portion 802. The structure of FIG. 20 can exhibit the same effects as the above-described embodiments.

FIG. 21 illustrates a pivot movement mechanism 85 including a joint portion 851, and an elastic member 852. The joint portion 851 extends over the first housing 121 and the second housing 122 to connect together these housings 121 and 122. The joint portion 851 is divided into left and right halves in a radial direction. A combination of the two halves provides a hollow cylindrical shape. Each end portion of the joint portion 851 is provided with a flange portion 851a protruding radially outwardly therefrom. Further, a through-hole 851b extending in the upward/downward direction is formed in the combined two halves to allow the connecting wires to extend therethrough. Incidentally, instead of the two halved structure divided in the radial direction, the joint portion 851 may be formed as a one-piece member.

The elastic member 852 is disposed along an outer peripheral surface of the joint portion 851 and at a position between upper and lower flange portions 851a. That is, the elastic member 852 is divided into left and right halves, and a combination of the two halves provides a cylindrical shape having a through-hole 852a for positioning the joint portion 851. The joint portion 851 is inserted in the through-hole 852a by elastic deformation of the elastic member 852. Incidentally, instead of the two halved structure divided in the radial direction, the elastic member 852 may be formed as a one-piece member.

The elastic member 852 is formed with grooves 852b each extending over an entire peripheral surface of the elastic member 852. The grooves 852b are engaged with protruding portions 201a and 202a protruding inward from the first housing 121 and the second housing 122, respectively.

Assembly will be performed as follows. In a state where one of the divided halves of the elastic member 852 and one of the divided halves of the joint portion 851 are assembled together, the connecting wires are disposed in the through-hole 851b of the joint portion 851. Then, remaining one of the divided halves of the elastic member 852 and remaining one of the divided halves of the joint portion 851 are assembled to the respective complementary ones of the elastic member 852 and joint portion 851. Then, a unit of the elastic member 852 and the joint portion 851 (actually, the upper groove 852b of the elastic member 852) is engaged with the protruding portion 201a of a first part of the first housing 121, and a second part of the first housing 121 is fixed to the first part by a screw. Then, the protruding portion 202a of a first part of the second housing 122 is engaged with the lower groove 852b, and a second part of the second housing 122 is fixed to the first part of the second housing 122 by a screw. Incidentally, the first housing 121 may be assembled after the second housing 122 is assembled. The structure of FIG. 21 can exhibit the same effects as the above-described embodiments.

FIG. 22 illustrates a pivot movement mechanism 87 including a support portion 871, elastic members 872, and an elastic member 873. The support portion 871 is integral with the second housing 122, and extends from the upper surface of the second housing 122 upward into the interior of the first housing 121. The support portion 871 has an upper end portion provided with a protruding portion 871a protruding radially outwardly therefrom, and is formed with a through-hole 871b allowing the connecting wires to pass therethrough. The elastic members 872 and the elastic member 873 are respectively divided into halves in the leftward/rightward direction.

The first housing 121 has a lower end portion provided with a protruding portion 220 protruding radially inwardly therefrom. One of the elastic members 872 is positioned between the protruding portion 220 of the first housing 121 and the protruding portion 871a of the support portion 871, and remaining one of the elastic members 872 is positioned between the protruding portion 220 of the first housing 121 and the upper surface of the second housing 122 in the upward/downward direction so that the respective elastic members 872 surround an outer peripheral surface of the support portion 871. Further, the elastic member 873 is arranged at a position below the protruding portion 220 of the first housing 121 and radially outward of the lower elastic member 872.

Assembly will be performed as follows. The divided halves of the elastic members 872 are assembled to the support portion 871 of a first part of the second housing 122, and the divided halves of the elastic member 873 is assembled to a grooved portion of the second housing 122 (the groove portion is defined on the outer peripheral surface and below the protruding portion 220). Then, the protruding portion 220 of a first part of the first housing 121 is positioned between the upper and lower elastic members 872 in the upward/downward direction. After the circuit board and connecting wires and the like are disposed in the first parts of the first housing 121 and the second housing 122, a second part of the first housing 121 is fixed to the first part of the first housing 121 by a screw, and a second part of the second housing 122 is fixed to the first part of the second housing 122 by a screw. The structure of FIG. 22 can exhibit the same effects as the above-described embodiments.

REFERENCE SIGNS LIST 1, 101, 200 . . . impact wrench
2, 102 . . . housing
3, 103 . . . motor,
8, 107 . . . control portion
9, P . . . battery pack
21, 121 . . . first housing
22, 122 . . . second housing
23 . . . load accommodating portion
24 . . . handle portion
25 . . . circuit board accommodating portion
40 . . . elastic member
42 . . . recessed portion
44 . . . protruding portion
108 . . . pivot movement mechanism
109 . . . first elastic member
110 . . . second elastic member
111 . . . third elastic member

The invention claimed is:

1. An electric device comprising:
a first housing accommodating therein a load portion configured to consume an electric power;
a second housing having one end portion connected to the first housing and another end portion to which a battery pack is connectable; and
an elastic member interposed between the first housing and the second housing, wherein:
the first housing comprises a first restricting portion positioned away from the elastic member,
the second housing comprises a second restricting portion positioned away from the elastic member and engageable with the first restricting portion, and
in a case where the second housing is urged to be separated from the first housing, the elastic member is deformed and the first restricting portion and the second restricting portion are engaged with each other to prevent the second housing from being separated from the first housing.

2. The electric device according to claim 1, further comprising a second elastic member interposed between the one end portion of the second housing and a confronting portion of the first housing in confrontation with the second housing.

3. The electric device according to claim 2, wherein:
one of the first restricting portion and the second restricting portion comprises a protruding portion protruding from one of the first housing and the second housing toward a remaining one of the first housing and the second housing, and
a remaining one of the first restricting portion and the second restricting portion comprises a recessed portion receiving the protruding portion with a gap provided therebetween.

4. The electric device according to claim 3, wherein the first housing comprises:

a load accommodating portion accommodating the load portion therein;

a handle portion connected to the load accommodating portion and configured to be gripped by a user; and a large diameter portion connected to the handle portion at a position opposite to the load accommodating portion with respect to the handle portion, the large diameter portion having a diameter greater than a diameter of the handle portion, and wherein the elastic member, the first restricting portion, and the second restricting portion are positioned between the large diameter portion and the second housing.

5. The electric device according to claim 3, further comprising a control portion configured to control the load portion, wherein the control portion is accommodated in the large diameter portion.

6. The electric device according to claim 2, wherein the first housing comprises:

a load accommodating portion accommodating therein the load portion configured to consume an electric power;

a handle portion connected to the load accommodating portion and configured to be gripped by a user; and a large diameter portion connected to the handle portion at a position opposite to the load accommodating portion with respect to the handle portion, the large diameter portion having a diameter greater than a diameter of the handle portion, the one end portion of the second housing being attached to the large diameter portion, the electric device further comprising a control portion accommodated in the large diameter portion and configured to control the load portion, and wherein the elastic member is interposed between the large diameter portion and the one end portion of the second housing to connect the second housing to the large diameter portion.

7. The electric device according to claim 6, wherein:

the second housing is spaced away from the large diameter portion only by the elastic member, and the large diameter portion comprises the first restriction portion.

8. The electric device according to claim 6, further comprising a second elastic member interposed between the one end portion of the second housing and a confronting portion of the large diameter portion, the confronting portion being in confrontation with the one end portion of the second housing.

9. The electric device according to claim 6, wherein:

the large diameter portion has a generally hollow cylindrical shape having an outer peripheral surface, the large diameter portion having an attachment portion on the outer peripheral surface, the elastic member being attached to the attachment portion, the second housing has an engagement portion with which the elastic member is engaged in a state where the second housing is connected to the large diameter portion, and the elastic member has a circular cross-section taken along a plane extending in a radial direction thereof.

10. The electric device according to claim 1, wherein:

one of the first restricting portion and the second restricting portion comprises a protruding portion protruding from one of the first housing and the second housing toward a remaining one of the first housing and the second housing, and a remaining one of the first restricting portion and the second restricting portion comprises a recessed portion receiving the protruding portion with a gap provided therebetween.

11. The electric device according to claim 1, wherein the first housing comprises:

a load accommodating portion accommodating the load portion therein;

a handle portion connected to the load accommodating portion and configured to be gripped by a user; and a large diameter portion connected to the handle portion at a position opposite to the load accommodating portion with respect to the handle portion, the large diameter portion having a diameter greater than a diameter of the handle portion, and wherein the elastic member, the first restricting portion, and the second restricting portion are positioned between the large diameter portion and the second housing.

12. The electric device according to claim 11, further comprising a control portion configured to control the load portion, wherein the control portion is accommodated in the large diameter portion.

13. The electric device according to claim 1, wherein the first housing comprises:

a load accommodating portion accommodating therein the load portion configured to consume an electric power;

a handle portion connected to the load accommodating portion and configured to be gripped by a user; and a large diameter portion connected to the handle portion at a position opposite to the load accommodating portion with respect to the handle portion, the large diameter portion having a diameter greater than a diameter of the handle portion, the one end portion of the second housing being attached to the large diameter portion, the electric device further comprising a control portion accommodated in the large diameter portion and configured to control the load portion, and wherein the elastic member is interposed between the large diameter portion and the one end portion of the second housing to connect the second housing to the large diameter portion.

14. The electric device according to claim 13, wherein:

the second housing is spaced away from the large diameter portion only by the elastic member, and the large diameter portion comprises the first restriction portion.

15. The electric device according to claim 13, further comprising a second elastic member interposed between the one end portion of the second housing and a confronting portion of the large diameter portion, the confronting portion being in confrontation with the one end portion of the second housing.

16. The electric device according to claim 13, wherein:

the large diameter portion has a generally hollow cylindrical shape having an outer peripheral surface, the large diameter portion having an attachment portion on the outer peripheral surface, the elastic member being attached to the attachment portion, the second housing has an engagement portion with which the elastic member is engaged in a state where the second housing is connected to the large diameter portion, and the elastic member has a circular cross-section taken along a plane extending in a radial direction thereof.

17. The electric device according to claim 1, wherein the first housing comprises a first attachment portion for receiving the elastic member, wherein:

the second housing comprises a second attachment portion for receiving the elastic member, and the elastic member is received in a space defined by the first attachment portion and the second attachment portion in a state where the second housing is connected to the first housing.

* * * * *